United States Patent [19]

Gelinas et al.

[11] Patent Number: 4,804,435
[45] Date of Patent: Feb. 14, 1989

[54] BONDING APPARATUS WITH ELECTROMAGNETIC WAVE GENERATOR

[75] Inventors: William A. Gelinas, Hadley, Mass.; Edwin R. Holtz, Enfield, Conn.; Dennis J. Argazzi, Deep River, Conn.; Robert L. Smigel, Higganum, Conn.; Dan W. Wiley, Bristol, Conn.

[73] Assignee: Loctite Corporation, Newington, Conn.

[21] Appl. No.: 21,445

[22] Filed: Mar. 4, 1987

Related U.S. Application Data

[62] Division of Ser. No. 745,656, Jun. 17, 1985, Pat. No. 4,661,190.

[51] Int. Cl.$^4$ .............................................. B32B 31/28
[52] U.S. Cl. .............................. 156/379.6; 156/380.9; 156/381; 156/497; 156/546; 156/556; 156/578; 156/579
[58] Field of Search ............... 156/275.5, 294, 273.5, 156/273.3, 275.7, 293, 303.1, 310, 315, 272.2, 379.6, 380.9, 381, 391, 497, 546, 556, 578, 579; 425/5, 501, 502, 506, 507, 508, 517, 174, 174.6, 177, 186; 427/233; 250/492.1; 29/148.4 D, 132, 110, 129

[56] References Cited

U.S. PATENT DOCUMENTS

| | | | |
|---|---|---|---|
| 3,960,624 | 6/1976 | Erlandson | 156/275.5 |
| 4,200,676 | 4/1980 | Caponigra et al. | 156/275.5 |
| 4,222,635 | 9/1980 | Jülke | 156/275.5 |
| 4,444,806 | 4/1984 | Margan et al. | 156/275.5 |
| 4,576,661 | 3/1986 | Persson | 156/294 |
| 4,588,467 | 5/1986 | Tani et al. | 156/294 |
| 4,661,190 | 4/1987 | Gelinas et al. | 156/275.5 |

FOREIGN PATENT DOCUMENTS 3132405 3/1983 Fed. Rep. of Germany ... 156/275.5

Primary Examiner—Richard V. Fisher
Assistant Examiner—Wanda L. Millard
Attorney, Agent, or Firm—Perman & Green

[57] ABSTRACT

Apparatus and a process for bonding a core member to a housing member, particularly, in instances in which the members do not mate in a contiguous fashion. The invention includes some manual and some semi-automatic functions, but is largely automated and computer controlled. A conveyor carries an assembly of an initially joined but unbonded core member and housing member along a series of discrete stations. After some preparatory steps in the process, an initial continuous bead of sealant is first applied on one side of the assembly to close off the space between the members and thereby form a cavity between them. The bead is cured, then the assembly is inverted and the cavity is filled with an anaerobic bonding material. A second continuous bead of sealant is then applied on the other side of the assembly to close off the remaining space between the members as well as to isolate the bonding material within the cavity. The second bead of sealant is also cured after which the fully bonded assembly is removed and replaced with a fresh assembly to be operated upon.

19 Claims, 14 Drawing Sheets

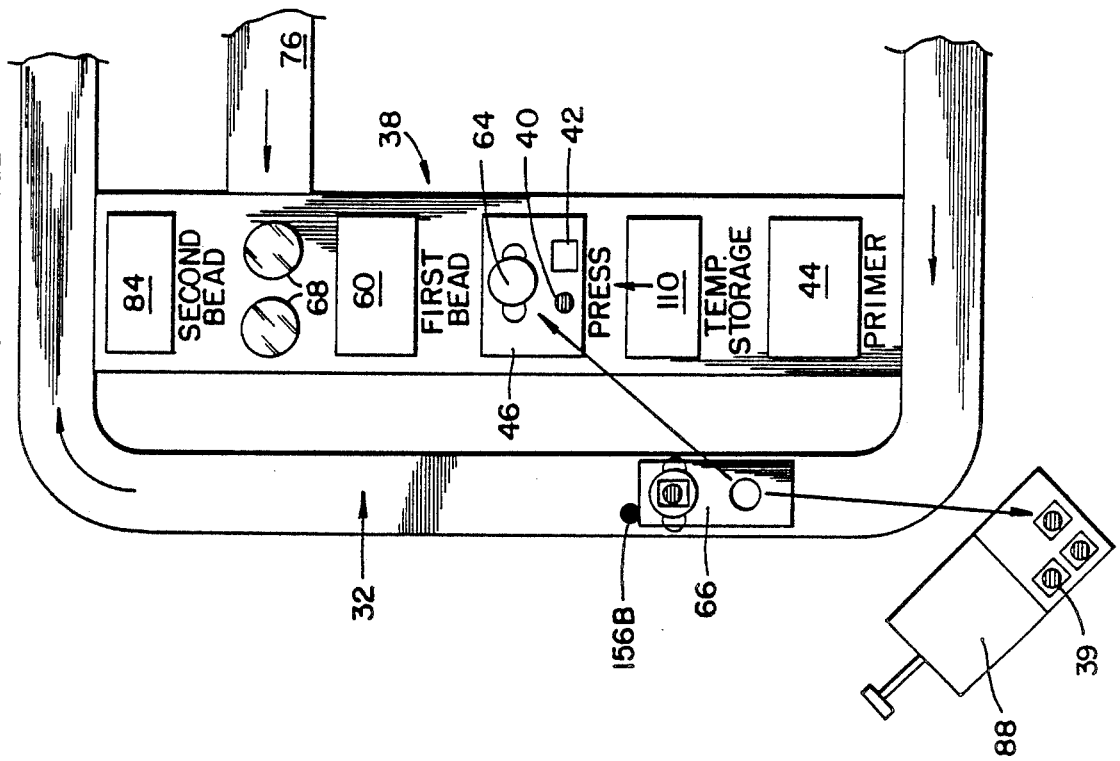
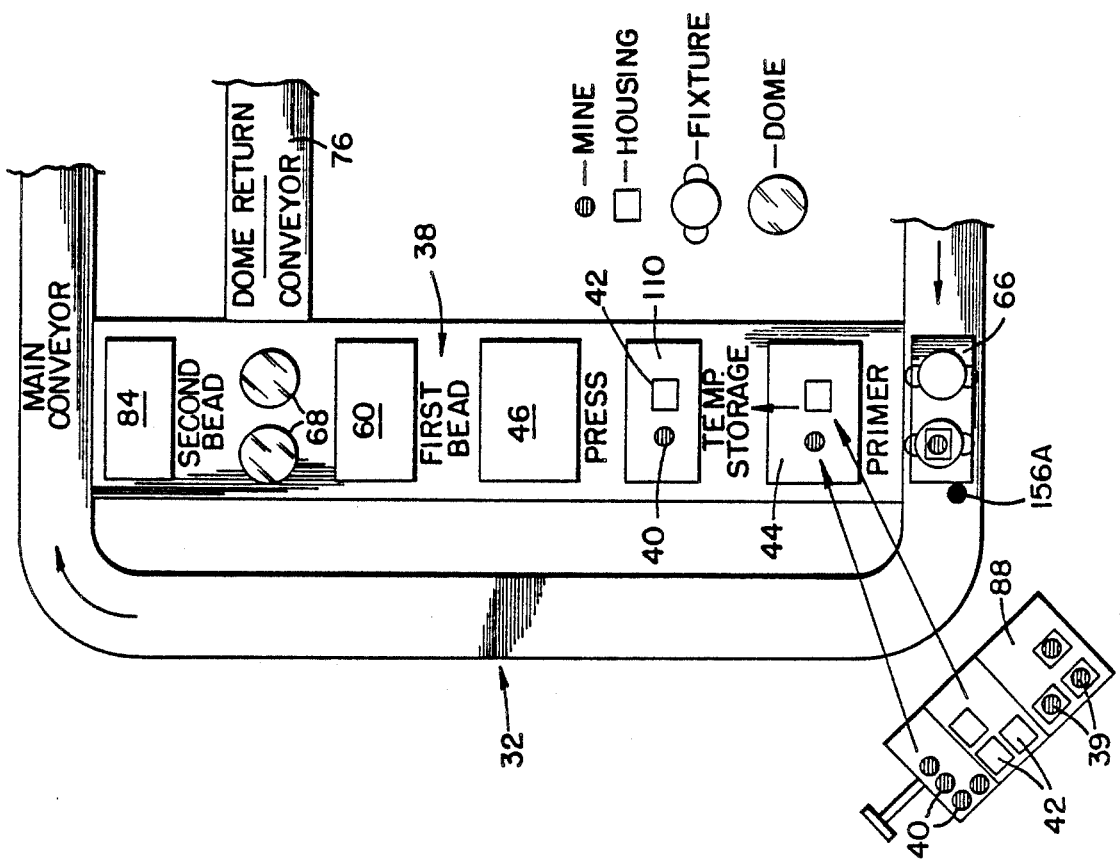

BONDING APPARATUS WITH ELECTROMAGNETIC WAVE GENERATOR

This is a division of application Ser. No. 745,656 filed June 17, 1985 which is now U.S. Pat. No. 4,661,190.

BACKGROUND OF THE INVENTION

1. Field of the Invention

The present invention relates to apparatus and a process for bonding a core member to a housing member and, more particularly, to a substantially automated process for bonding such members even in instances in which the members do not mate in a contiguous fashion.

2. Description of the Prior Art

A particular application in which a core member is bonded to a housing resides in the assembly of land mines used by the military. Typically, a mine includes a core member with an outer shell of a composite material which encompasses explosive material and an arming device. This core member is then joined with a housing member composed of ABS-type (such as acrylonitrile butadiene-styrene) plastic material which serves in part as an outer protection for the mine.

Previously, mines and their associated housings were joined toether, then bonded, using largely manual techniques. This exposed assembly personnel to considerable danger. Additionally, it was often difficult when using hand assembly techniques to maintain the consistent standards required by military specifications. Also, manual assembly was time-consuming and often times resulted in a low rate of production and accompanying high cost per unit.

SUMMARY OF THE INVENTION

It was with recognition of a need and of the state of the prior art, generally as described above, that the present invention was conceived and has now been reduced to practice. Specifically, the invention relates to apparatus and a process for bonding a core member to a housing member, particularly, in instances in which the members do not mate in a contiguous fashion. The invention includes some manual and some semi-automatic functions, but is largely automated and computer-controlled. After some preparatory steps in the process, a conveyor carries an assembly of an initially joined but unbonded core member and housing member along a series of discrete stations. An initial continuous bead of sealant is first applied on one side of the assembly to close off the space between the members and to thereby form a cavity between them. The bead is cured, then the assembly is inverted and the cavity is filled with an anaerobic bonding material. A second continuous bead of sealant is then applied on the other side of the assembly to close off the remaining space between the members as well as to isolate the bonding material within. The second bead of sealant is also cured after which the fully bonded assembly is removed and replaced with a fresh assembly to be operated upon.

The overall arrangement of the apparatus for performing process is unique. Additionally, operation of the conveyor itself as well as the methods and apparatus employed at individual stations is also unique. For example, a sealed dome member is placed over an assembly following the application of a continuous bead of sealant. This provides the assembly with an isolated atmosphere. Thereafter, nitrogen gas is injected into the dome member and the air simultaneously forced out to thereby effect a more rapid cure for the sealant than was previously possible when subjected to ultraviolet radiation in a subsequent step. The dome is subsequently removed in order to permit subsequent operations to be performed.

The invention, then, enables a higher rate production than was previously possible as well as obtaining more accurate and stronger bonds on a consistent basis than were achieved by prior known techniques. The invention also enables use of a concentrated manufacturing area thereby significantly reducing the capital expenditure to house and maintain such a system.

By reason of the largely automated nature of the invention there are fewer personnel involved and therefore fewer personnel subject to danger when potentially destructive materials are involved.

In the course of the process disclosed, only exact amounts of material used for the process are dispensed according to a predetermined schedule of needs with concomitant reduced waste of expensing bonding, and other, materials.

Also, improved materials are utilized in the process of the invention thereby resulting in more rapid curing and stronger bonds being achieved. Other and further features, objects, advantageous and benefits of the invention will become apparent from the following description taken in conjunction with the attached drawings. It is to be understood that both the foregoing general description and the following detailed description are exemplary and explanatory but are not restrictive of the invention. The accompanying drawings, which are incorporated in and constitute a part of this invention, illustrate one embodiment of the invention, and together with the description, serve to explain the principles of the invention.

BRIEF DESCRIPTION OF THE DRAWINGS

In the drawings:

FIGS. 4A, 4B, 4C, 4D, and 4E illustrate partial top plan diagrammatic views of a portion of a system illustrated in FIG. 1 and serve to illustrate successive manual or semi-automatic operations which occur during the course of the process of the invention;

DESCRIPTION OF THE PREFERRED EMBODIMENT

Figure 1:
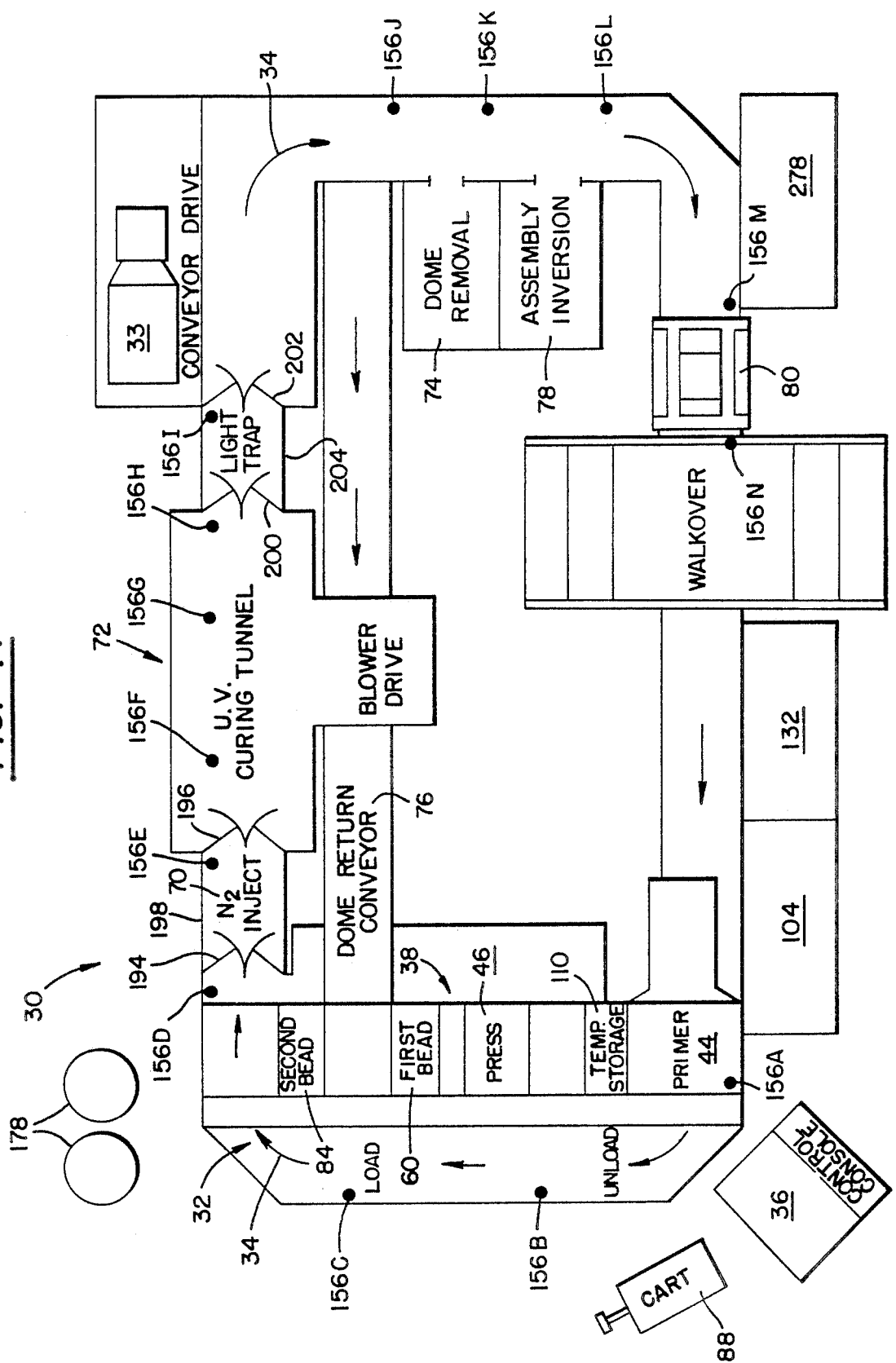
FIG. 1 is a top plan, diagrammatic, view of an overall system for performing the process of the invention.

Turn now to the drawings and initially to FIG. 1 which diagrammatically illustrates a manufacturing system 30 embodying the invention. A conveyor 32 driven by a suitable prime mover 33 operates continuously at a constant rate of speed in a clockwise direction as indicated by arrows 34. In addition to several automatic operations which are performed at discrete operating positions or stations along the length of the conveyor, there are also certain manual or semi-automatic operations which interrelate with the automatic operations of the system.

The operation of the system 30 is controlled from a control console 36. All manual and semi-automatic operations are performed at the left end of the system 30 as illustrated in FIG. 1 and, specifically, at an assembly bench area 38.

The system 30 serves to join together an assembly 39 (see FIG. 2) comprised of a core member 40 and a housing member 42, then to bond them securely together into an integral unit. A continuing series of operations are performed by the system in a step-by-step sequence. At the outset of the operation of the system 30, the core member 40 and the housing member 42 are separated. As operation of the system 30 proceeds, the members 40 and 42 are joined together to form the assembly 39 after which a series of operations are performed on the assembly to result in a finished product. In order for all operations to be completed, an individual assembly and its component members must make two complete passes through the system 30.

As an aid to the reader, a broad, general description of the system 30 will be described initially followed by a detailed description or explanation of each of the operations and components of the system.

Referring to FIG. 1, operations are seen to commence at a primer station 44 at which a core member 40 and housing member 42 are manually placed for an initial coating operation. When the members are properly placed in position, the coating operation proceeds automatically. Following activities at the primer station, the members 40 and 42 are manually forwarded to a press station 46 at which they are integrated into the assembly 39 on a fixture 64. Thereafter, members 40 and 42 are never again separated but remain joined together as an assembly.

Figure 3:
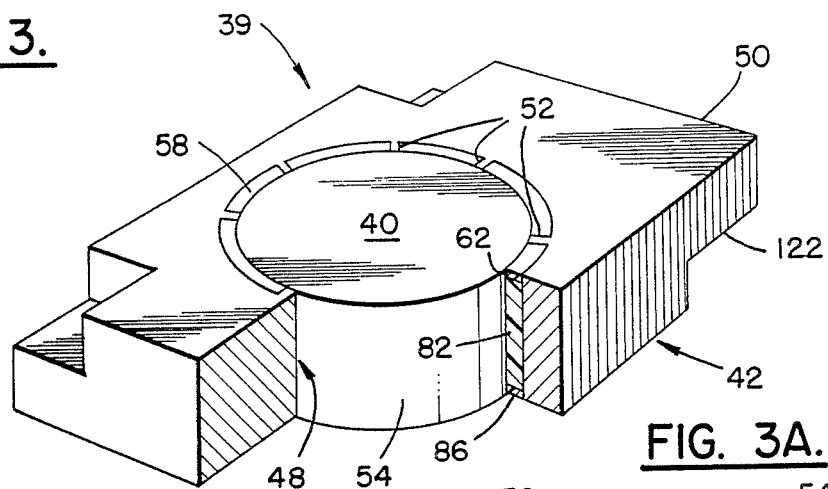
FIG. 3 is a detail perspective view, certain parts being cut away and shown in section, illustrating an assembly comprised of a mine and housing in a completely bonded condition after completion of the process disclosed herein.
Figure 3A:
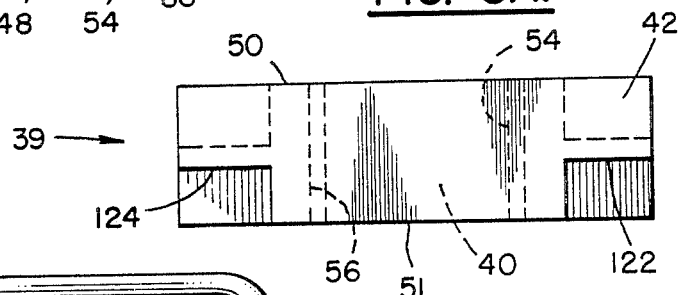
FIG. 3A is a side elevation view of the assembly illustrated in FIG. 3.

With reference to FIGS. 3 and 3A, it is noteworthy that the housing member 42 is formed with a hole 48 extending thereto from a surface 50 to a surface 51. Furthermore, a plurality of ribs 52 integral with the housing member 42 extend into the hole 48 and serve to separate an outer peripheral surface 54 of the core member 40 from an inner peripheral surface 56 of the housing member 42. A plurality of cavities 58 are thereby formed, each cavity defined by the surfaces 54 and 56 and adjacent pairs of ribs 52.

Figure 2:
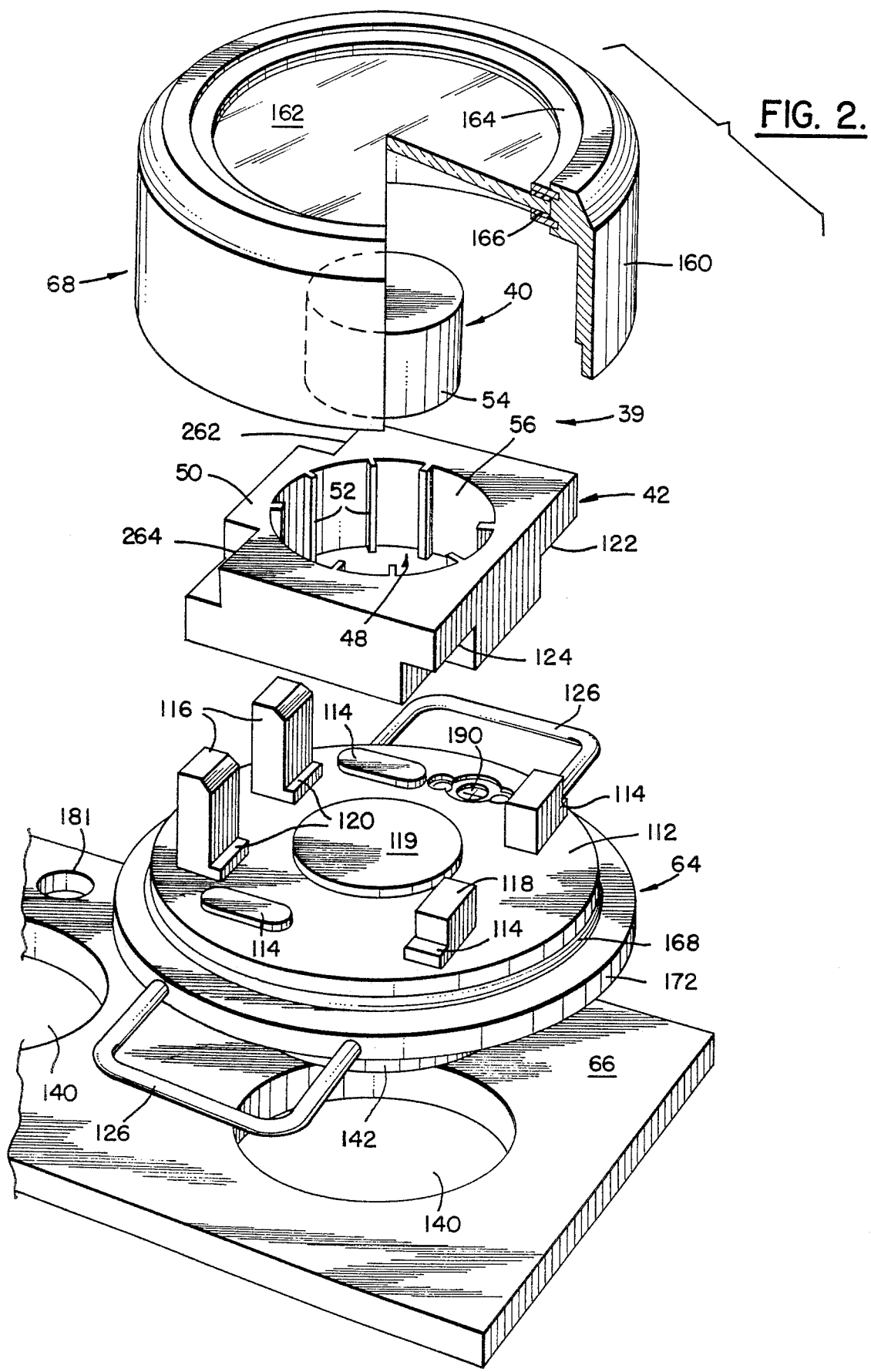
FIG. 2 is a perspective exploded view illustrating a core member and a housing member and components utilized by the system in performing the process of the invention.

After the assembly 39 is removed from the press station 46, it is manually delivered to a first bead station 60 at which a first bead 62 of viscous sealant is applied at one end of the assembly 39 overlying each cavity 58. Thereafter, the assembly 39, which is mounted on fixture 64, is removed from the first bead station 60. In turn, the fixture 64 is mounted on a pallet 66 which is positioned on the conveyor 32 for movement therealong. The assemblage of devices illustrated in FIG. 2 is completed when a dome member 68 is mounted on the fixture 64 so as to envelope the assembly 39. From this point forward until the end of the sequence of operations performed by the system 30, the assembly 39 generally remains with its associated pallet 66 and fixture 64, proceeding with the conveyor 32.

The assembly 39 is next delivered to a nitrogen injection station at which nitrogen or other inert gas or mixture of gases or of gaseous compounds form an atmosphere surrounding the assembly within the dome member 68. The process continues as the assembly 39 passes through an ultraviolet radiation zone 72 which serves to cure the bead of sealant 62 which had previously been applied to the assembly. After leaving the radiation zone 72, the assembly 39 advances to a dome member removal station 74 at which the dome member 68 is removed from the fixture 64, placed onto a return conveyor 76 by means of which the dome member 68 is returned to the assembly bench area 38.

Next in the sequence of events, the assembly 39 is inverted so that the side of the assembly on which the first bead of sealant 62 has been applied is placed on the bottom and the other side of the assembly is raised. This takes place at an assembly inversion station 78 after completion of which the assembly 39 is advanced to an anaerobic material dispensing station 80. At the station 80, anaerobic bonding material 82 is injected into the cavities 58. After completion of operations at the station 80, all meaningful operations for the first pass through the system 30 by the assembly 39 has been completed.

After leaving the dispensing station 80, the assembly proceeds until it is removed briefly by an operator for manual insertion into a mechanism at a second bead station 84. At this station, once the assembly has been manually placed in position, a second bead 86 of sealant is automatically applied so as to overlie the cavities 58 adjacent the surface 51 of the housing member 42. This serves to isolate the anaerobic bonding material 80 which was previously injected into each of the cavities 58.

After completion of this operation, the assembly 39 together with its fixture 64 is again returned to its associated pallet 66. Again, a dome member 68 is placed on the fixture over the assembly. The pallet and its cargo are then again delivered to the station 70 and the assembly again subjected to an atmosphere of suitable inert gas or gases. Following the operation at station 70, the assembly is again subjected to ultraviolet radiation in the zone 72, then proceeds to station 74 for removal of the dome member 68.

On its second pass through the system 30, the assembly 39 is not operated on at the inversion station 78 nor at the dispensing station 80 and after passing through these stations is removed from the system as a completed assembly.

Figure 4E:
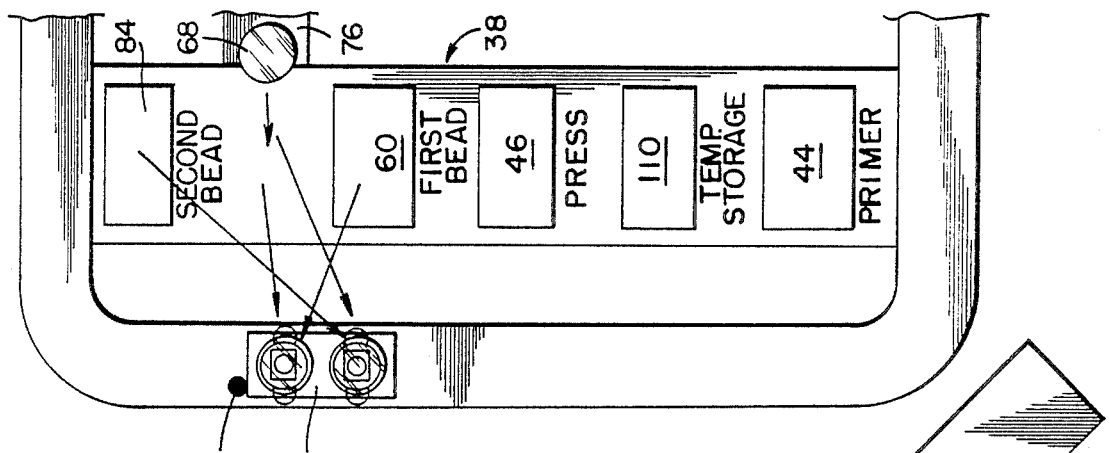
Figure 4D:
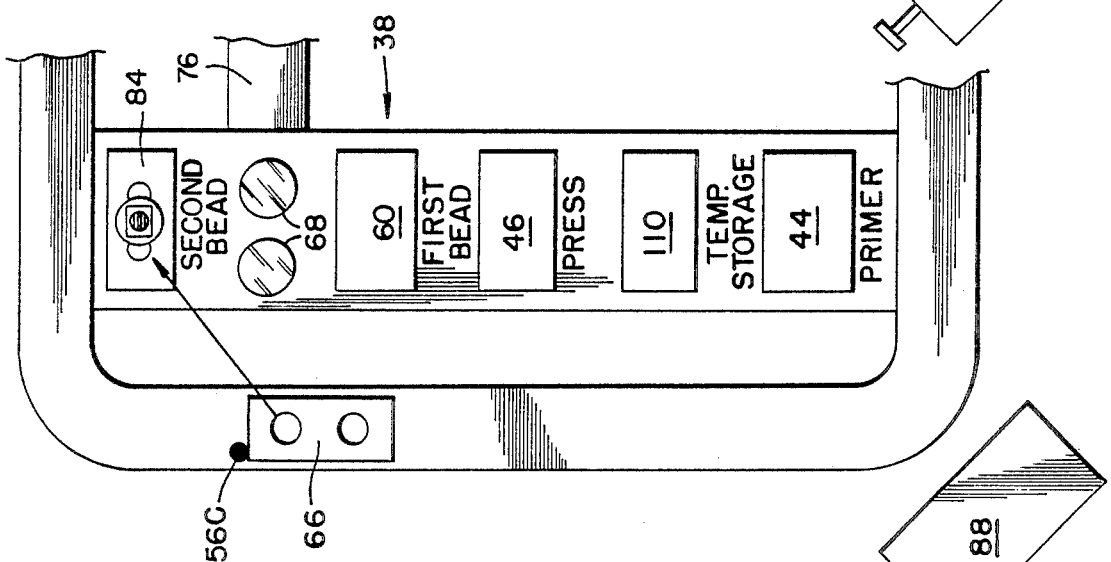

A more detailed description of the system 30 and its operation will now be described. As illustrated in FIG. 1 as well as in FIGS. 4A-4E, the system 30 utilizes a wheeled cart 88 which is preferably positioned in the vicinity of the assembly bench area 38. This is the general area where the operator or operators for the system are generally positioned. The cart 88 is illustrated in FIG. 4A as storing large numbers of core members 40 and housing members 42, both of which are awaiting operations to be performed by the system 30, and completed assemblies 39.

Figure 5:
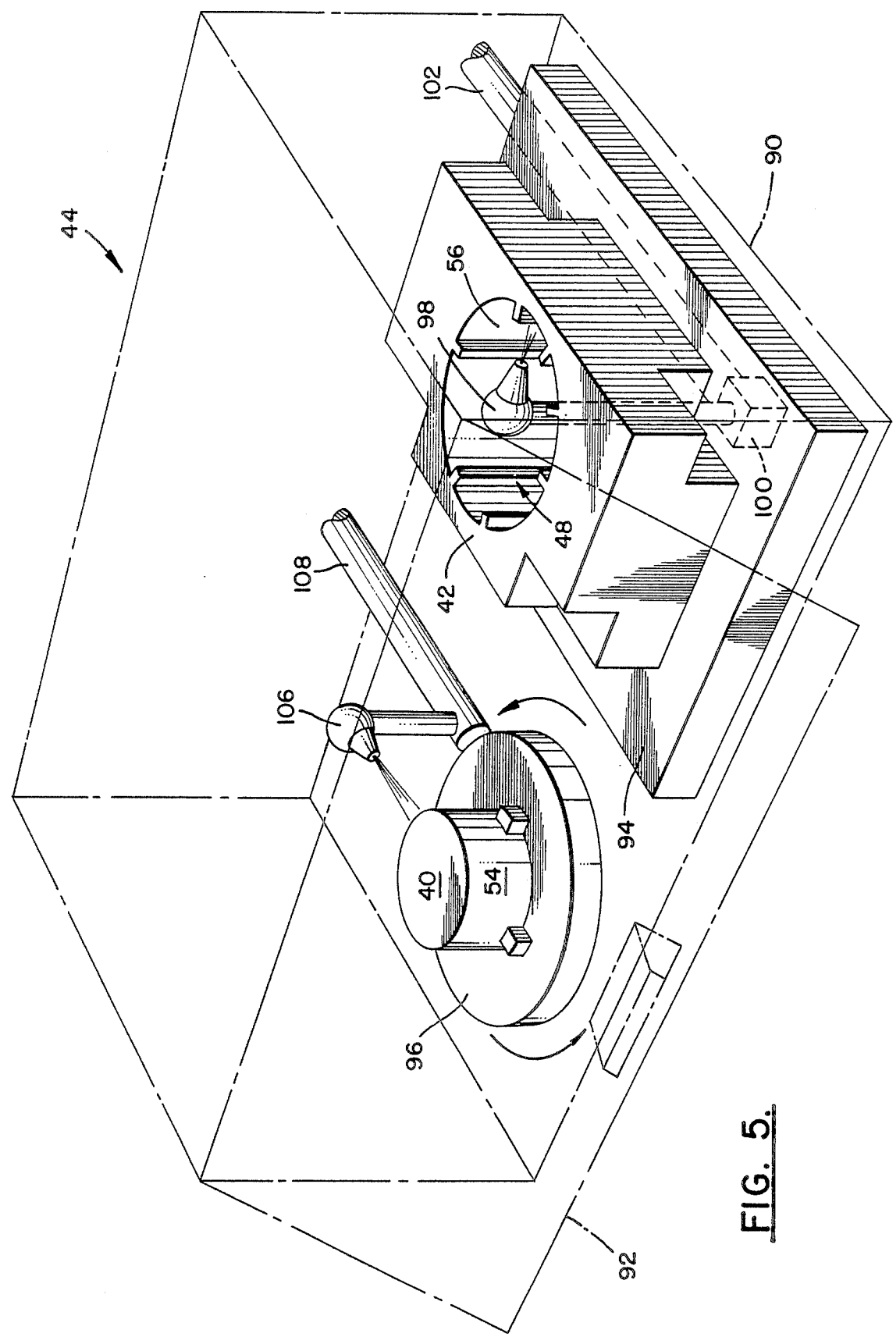
FIG. 5 is a perspective view of one station of the process at which primer is sprayed onto core members and housing members separately within an enclosure indicated in phantom.

As a first operation to be performed by the system 30, an operator removes a virgin core member 40 and a virgin housing member 42 from the cart 88 and delivers them to the primer station 44. The primer station is diagrammatically illustrated in FIG. 5 as comprising an enclosure 90 with a suitable handle operated door 92 allowing insertion of the members 40 and 42 into the enclosure and removal of the members after an operation has been performed. Within the enclosure 90, there is a stationary support member 94 on which the housing member 42 is placed. Beside the support member 94 is a rotatable support member 96 on which the core member 40 is positioned. The primer station 44 serves to apply a priming composition to the outer surface 54 of the core member 40 and to the inner surface 56 of the housing member 42. The priming composition serves to activate the cure of the anaerobic bonding material 82 which will be subsequently applied to the assembly at the dispensing station 80. The priming composition preferably dries rapidly. One example of such a composition which has a freon base is Loctite Part No. 18028, manufactured by Loctite Corporation of Newington, Conn. Loctite Part No. 18028 is a proprietary, non-flammable, low viscosity primer for activating metal and plastic surfaces and causing the bonding material 82 to cure through large gaps.

With the core and housing members 40 and 42, respectively, in position on their support members, the door 92 is closed, upon which event operations are automatically initiated. Specifically, a nozzle 98 is suitably rotated by any suitable means such as by an air motor 100 to discharge the priming composition introduced via a conduit 102 form a reservoir 104 (FIG. 1). The nozzle 98 extends upwardly into the hole 48 and, as it rotates, discharges priming composition onto the peripheral surface 56. Simultaneously, the support member 96 is rotated and a fixed nozzle 106 discharges the chemical composition received via a conduit 108 from the reservoir 104 onto the outer peripheral surface 54 of the core member 40. Operations at the primer station 44 continue for a predetermined period of time which is a function of the flow rate of the priming composition, the rotational speed of the support member 96 and of the nozzle 98, and the desired thickness of the priming composition on the receiving surfaces. After the predetermined period of time has passed and the operation is completed, the operator opens the door 92, removes the core member 40 and housing member 42 and places them temporarily on a storage shelf 110 in readiness for delivery to the press station 46.

Although it may be desirable to advance the core member 40 and the housing member 42 from the primer station 44 to the temporary storage shelf 110, an operator can also deliver those items directly to the press station 46 (see FIG. 4B) together with a fixture 64 taken from the pallet 66 supported on the conveyor 32 beside the assembly bench area 38. The press station 46 comprises a hand movable press whose construction is not important for purposes of the present invention. At the press station, the operator places an empty fixture on the assembly press and then places core member 40 on core platform 119 of fixture 64 in the appropriate position. The operator then places the housing member 42 with its hole 48 in registration with the core member 40 and gently urges it into position so that ribs 52 on its inner peripheral surface 56 are lightly engageable with the outer peripheral surface 54 of core member 40. Generally, once these two parts are positioned on top of one another, they will not be seated completely. However, with movement of a lever (not shown), the hand movable press imparts a vertical motion on a suitable mechanism which compresses the two members together until they assume the registration generally illustrated in FIGS. 3 and 3A. In some instances, the registration of the members 40 and 42 may be by press fit and in other instances they may be relatively loose. The press station 46 is actually only necessary in those instances in which there is interference between the ribs 52 and the outer surface 54 of the core member 40.

As mentioned above, the joining of the core member and of the housing member to form the assembly takes place with the fixture 64 in position (see FIG. 2). Thus, in the event of a loose fit, the housing member 42 descends relative to the core member 40 only until it reaches generally flat upper surfaces 114 and 120 of the fixture. The surface 112 is provided with a pair of spaced apart pads 114 and 120 which receive the lower surface 51 (FIG. 3A) of the housing member 42 thereon. Upstanding registration elements 116 and 118 are also fixed on the flat surface 112 and serve to properly position the housing 42 on the fixture within specified limits. The taller elements 116 engage a side of the housing 42 and have notched out supporting surfaces 120 which also receive the lowersurface 51 of the housing member. The registration elements 118 are generally opposite the elements 116 and engage, respectively, with spaced apart notched out regions 122 and 124. In this manner, the housing member 42 is supported on the fixture 64 in a manner so as to be generally immovable in horizontal directions and downwardly and the core member 40 is also held positioned within the hole 48 in the housing member.

From this point forward in the course of the operation of the system 30, the assembly 39 comprised of the core member 40 and housing member 42 is accompanied by and generally supported on the fixture 64. Preferably, of circular shape, the fixture is provided with a pair of diametrically opposed handles 126 which enable an operator to lift the fixture and any members supported thereon as a unit without touching the members themselves.

It may be desirable to place a sensor (not shown) at the assembly press station 46 to inform the operator as to whether or not the core member 40 is properly oriented within the housing member 42. If such orientation is not proper, a suitable signal, such as a red light on the control console 36 could be used to alert the operator to that fact. The operator would then take the necessary manual steps to achieve proper orientation. With success, a green light or other suitable signal on the console 36 is illuminated informing the operator that the core and housing members are now properly oriented and prepared for subsequent operations.

Figure 4C:
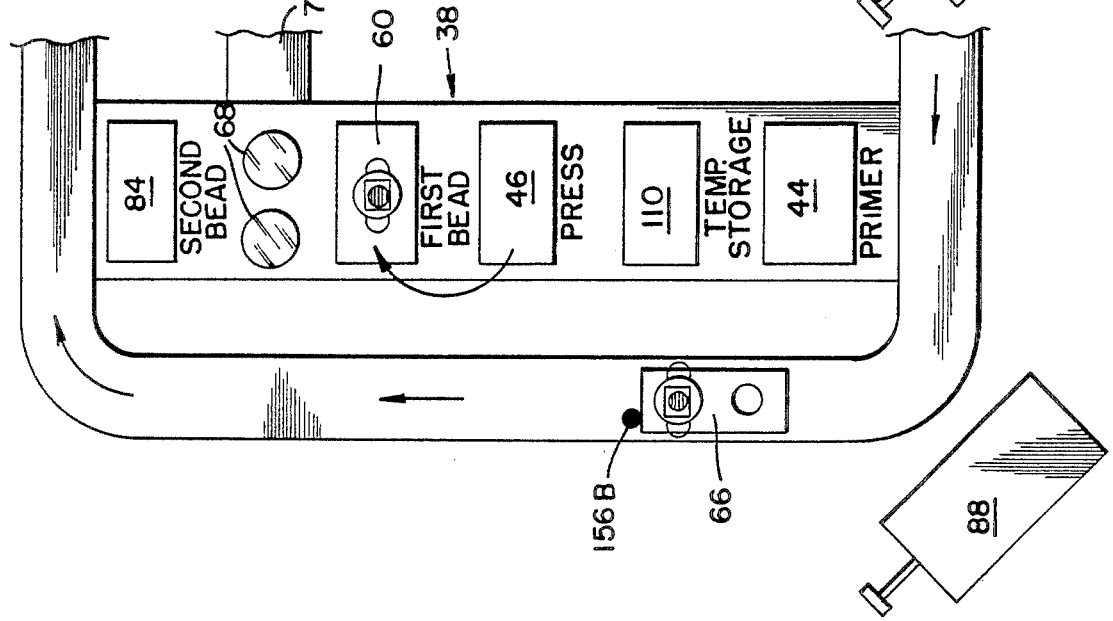

Turn now to FIG. 4C which illustrates the fixture 64, now carrying the assembly 39, being transferred to the next station, namely, the first bead station 60. From the standpoint of the operator, the operation of the first bead station 60 may be similar to that for the primer station 44. That is, the apparatus for performing the operation may be located within an enclosure (not shown) and initiated when a door to that enclosure is moved by the operator from an open to a closed position. The specific operation performed and mechanism employed at the first bead station 60 may be substantially as disclosed in commonly assigned U.S. patent application Ser. No. 745,655 of W. Gelinas and R. McDermott, filed 6-17-85, entitled "Variable Flow Rate Dispensing Valve Assembly", which is incorporated by reference herein.

Figure 7:
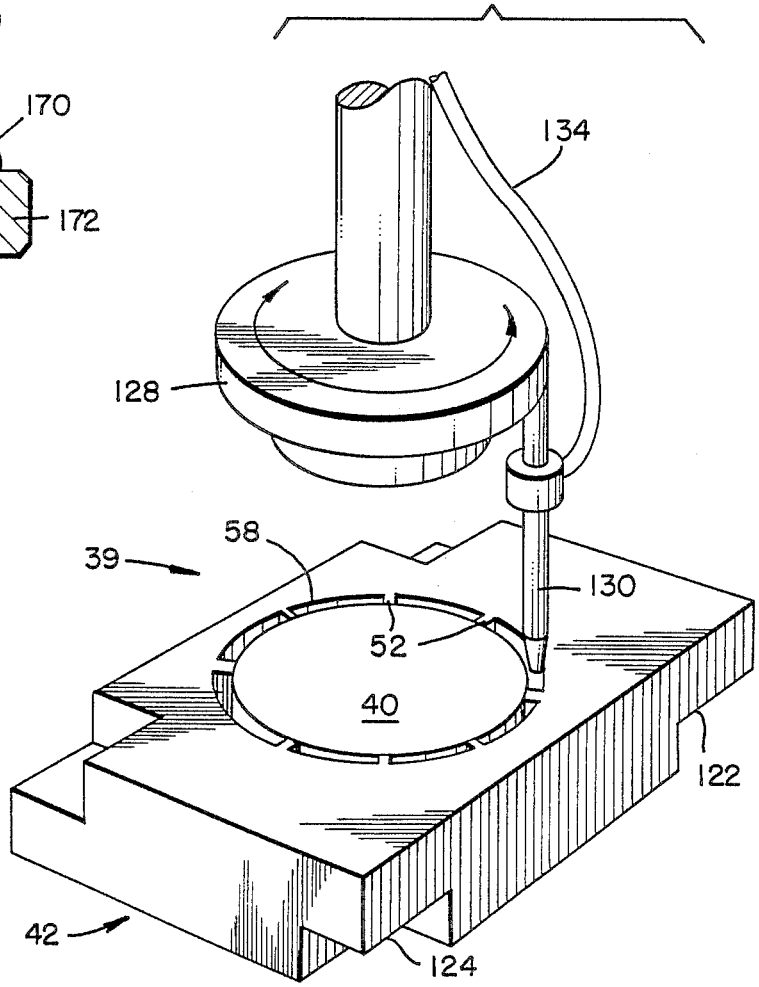
FIG. 7 is a diagrammatic perspective view illustrating the application of a bead of sealant to one end of the assembly performed at another operating position of the system.

As disclosed therein and with reference herein, briefly to FIG. 7, the assembly 39 is suitably positioned in an enclosure (not shown) such that a dispensing head 128 and its associated nozzle 130 overlie the cavities 58 between the core member 40 and the housing member 42. For purposes of explanation, the dispensing head 128 is illustrated as being rotatable about a vertical axis. However, it is also within the scope of the invention for the head 128 to be held stationary while the fixture 64 and assembly 39 thereon are rotated relative to the nozzle 130. In either event, a first continuous bead 62 of suitable viscous sealant material supplied by the nozzle 130 is drawn from a reservoir 132 (FIG. 1) via a flexible conduit 134. One example of a suitable sealant is that manufactured and marketed by Loctite Corporation of Newington, Conn. under the Part Number 190034. Part No. 190034 is a proprietary high viscosity, thixotropic explosive compatible compound that cures with ultraviolet light to form a flexible seal for large gap areas.

Figure 7A:
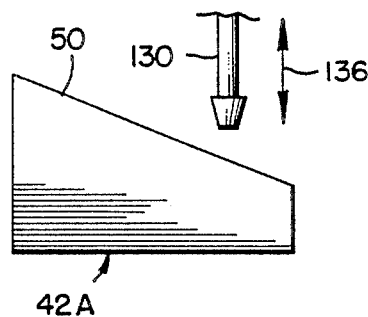
FIGS. 7A and 7B are side elevation and top plan, diagrammatic, views, respectively, illustrating an application of sealant in instances in which an assembly or its component parts are irregularly shaped.
Figure 7B:
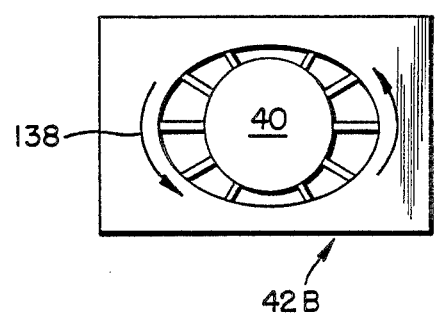

The bead 62 is applied to the peripheral surfaces 54 and 56 (FIGS. 3 and 3A) at a terminal region of the cavities 58, that is, at the region at which the cavities 58 cease to exist. As illustrated in FIG. 7, the shapes of the core 40 and of the housing member 42 appear to be regular. Also, the spacing between them appears constant and their upper surfaces appear to lie in a common horizontal plane. However, such regularity need not be the case. For example, as illlustrated in FIG. 7A, the nozzle 130 may be required to reciprocate in the directions of a double arrowhead 136 in order to accommodate a sloping upper surface 50 of a housing member 42A. Similarly, as illustrated in FIG. 7B, there may be irregular spacing between the core member 40 and a housing member 42B. This would require that varying amounts of sealant be injected by the nozzle 130 depending upon the azimuthal. position of the.core and housing member as rotation occurs in the direction of arrowheads 138. In a typical example, the spacing between the core member 40 and he housing member 42B can vary from between 0.040 inches to approximately 0.100 inches.

It will also be appreciated that there may be instances in which the core member 40 and its associated housing member 42 are not coterminous. Hence, the bead 62 must be applied where either one of the members terminates or where they both terminate together. Further, it may be that the nozzle 130 must follow a contour in which the top surface may be flat for a stretch, then inclined, as illustrated in FIG. 7A, all the while that the spacing between the core member and its associated housing member is varied as illustrated in FIG. 7B. Thus, not only need the nozzle 130 follow the appropriate contour, but it must also vary the volume of the sealant material to be dispensed. Sealant material used for the bead 62 is sufficiently viscous that it remains in place at the terminal region of the cavities 58 and does not flow downwardly into their inner regions. However, the bead remains in a semisolid state until it is later subjected to ultraviolet radiation at the zone 72. The composition of the sealant is such that it is cured by being exposed to ultraviolet radiation.

After operations at the first bead station 60 are completed, the operator places the fixture 64 and its associated assembly 39 onto a pallet 66 (see FIG. 4E) already in position on the conveyor 32. The pallet 66 has a pair of circular depressions 140 formed therein in tandem relationship and adapted to freely, but matingly receive a cylindrical projecting undersurface 142 of the fixture 64.

Figure 8:
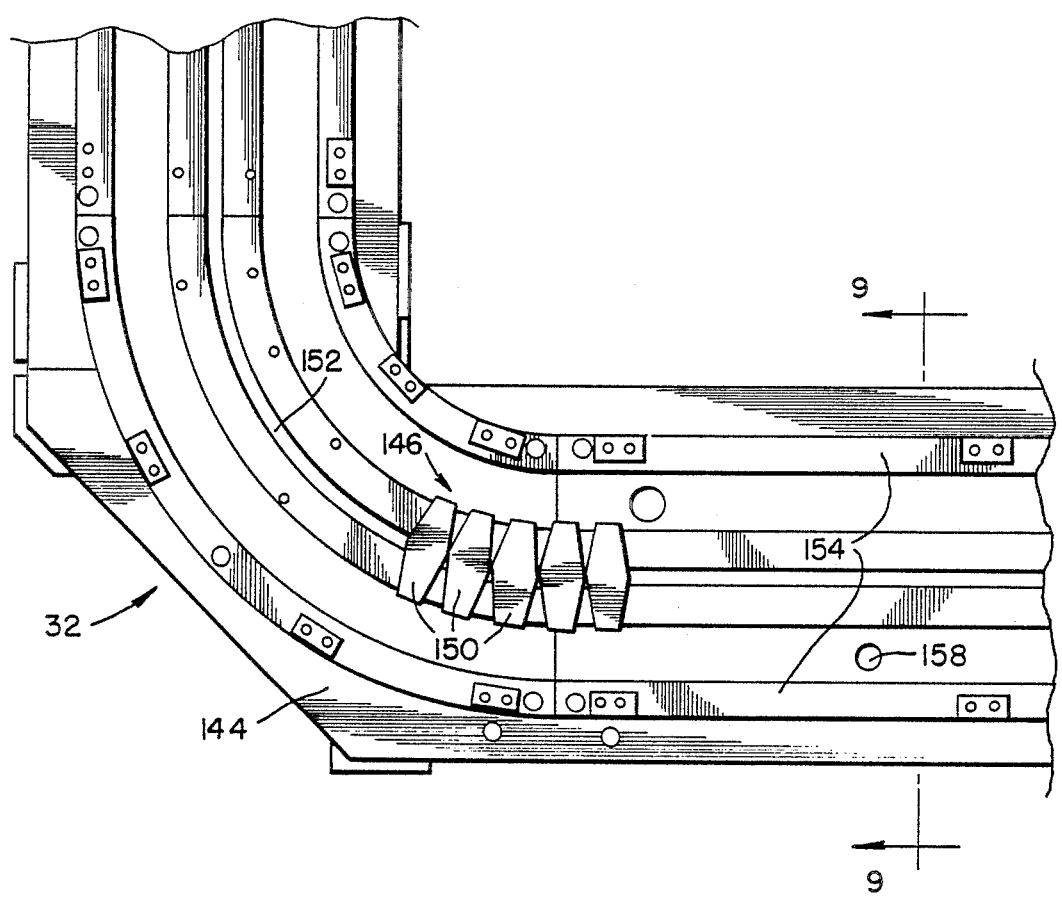
FIG. 8 is a detail top plan view of a portion of a conveyor utilized by the invention.
Figure 9:
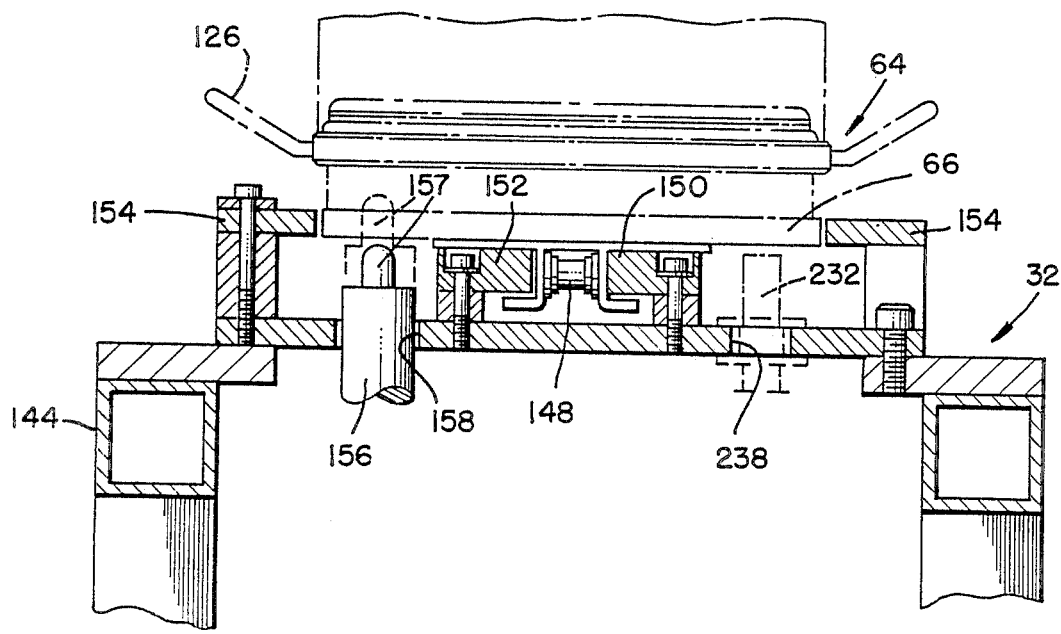
FIG. 9 is a cross section view taken generally along line 9—9 in FIG. 8 and illustrating, in phantom, a pallet and fixture positioned thereon.

Turn now to FIGS. 8 and 9 for a brief description of the conveyor 32. The conveyor 32 is provided with a frame supporting structure 144 on which a movable element 146 is continuously advanced so as to move the pallet 66 and the assembly 39 thereon to the plurality of stations constituting the system 30. Specifically, the movable element may of any suitable design, one example being a Rexnord Series 1873 side flexing chain 148 (FIG. 9) which mounts at spaced locations therealong a continuing series of LF Acetal top plates 150. The chain 148 operates continuously by means of the prime mover 33 and is guided along the conveyor 32 by means of a track 152 suitably mounted on the frame structure 144. As the pallet 66 advances along the conveyor resting on the upper surface of the top plates 150 and in frictional engagement thereon, the pallet is laterally guided by opposed smooth surfaced guide members 154 whose spacing is only slightly greater than the width of the pallet.

When an operation is to be performed on the assembly 39 at a particular station, a suitably positioned stop gate 156 is operated to stop the pallet. The stop gate 156 includes a projection pin 157 which is laterally disposed beyond the path of the top plates 150 yet in line with the path of the pallet 66. The stop gate 156 extends through an opening 158 in the frame 144 and, by means of compressed air or by a solenoid or by any other suitable mechanism, is movable between inactive and active positions. The inactive position is illustrated by solid lines in FIG. 9 and permits the pallet 56 to proceed on the movable element 146. The active position is illustrated by dotted lines and, in that position, is engageable with the front side of the pallet thereby holding the pallet motionless and enabling an appropriate operation to be performed on the assembly. The coefficient of friction between the top plates 150 and the pallet 66 is of a carefully chosen value. That is, it must be sufficiently large to assure that the pallet 66 and its cargo will normally move in unitary fashion with the top plates 150. However, it must be sufficiently small so that there is minimal wear on the plates and on the pallet when a stop gate 156 is moved to the active position such that the pallet is left "idling" on the movable element.

Figure 10:
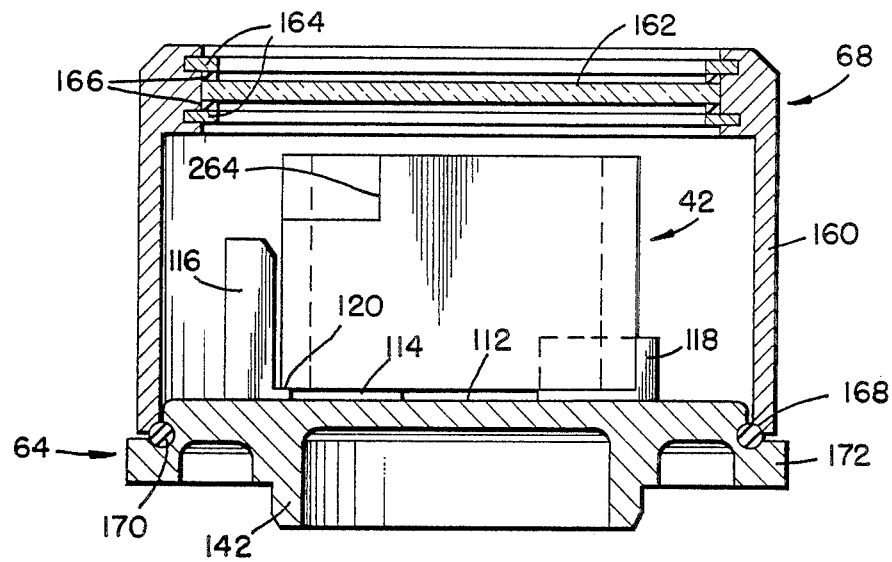
FIG. 10 is a cross section view taken generally along line 10—10 in FIG. 6 and illustrating a dome member mounted on the fixture and enveloping the assembly comprised of the core member and its associated housing.

As illustrated in FIG. 4E, the fixture 64 and its associated assembly 39 are placed onto the pallet 66 from the first bead station 60. This occurs when the pallet 66 is left idling on the conveyor 32 by reason of operation of the stop gate 156C. Immediately following placement of the fixture on the pallet, a dome member 68 is removed from the assembly bench area 38 and placed on the fixture 64 so as to envelop the assembly 39. This arrangement is particularly well seen in FIG. 10 which illustrates the dome member 68 as having a generally cylindrical body section 160 fabricated from aluminum or other suitable material and having a window 162 comprising its upper surface. The window is preferably composed of glass of the type manufactured and sold by Corning Glass Works under the trademark "Pyrex", or other suitable material. The glass material which has been employed may have a thickness of about one-quarter inch and transmits approximately 90% of available light energy above the approximately 360 nanometer frequency range.

As previously explained, the assembly 39 is to be subjected to ultraviolet radiation at the zone 72 which is located downstream from the location at which the dome member 68 is mounted on the fixture 64. In order to effectively isolate the interior of the dome 68 from the surrounding atmosphere, the window 162 is mounted to the body section 160 by means of a pair of annular rings 164 which hold appropriate seals 166 in position at the interface between the window and the body section. Additionally, the lower rim of the body section 160 is chamfered as at 168 so as to sealingly engage an o-ring seal 170 which is mounted on an annular ring 172 of the fixture 64. The weight of the dome member 68 on the seal 170 is sufficient to provide an airtight closure on the fixture 64. At the same time, the arrangement serves as a check valve operable to allow escape of gases should the pressure within the dome member reach excessive levels.

Thereupon, the stop gate 156C is withdrawn to an inactive position in order to permit the pallet and its cargo to move to the next appropriate station of the system 30. The next succeeding stop gate, indicated by reference numeral 156D, is also moved to an inactive position to allow entry of the pallet 66 into the nitrogen injection station 70. However, stop gate 156E is held in the active position to engage the pallet and hold it in an idling condition at the station 70. Thereupon, the stop gate 156D is moved to the active position to prevent any subsequent pallet from entering the nitrogen injection station 70 while a pallet is already positioned therein.

Figure 11:
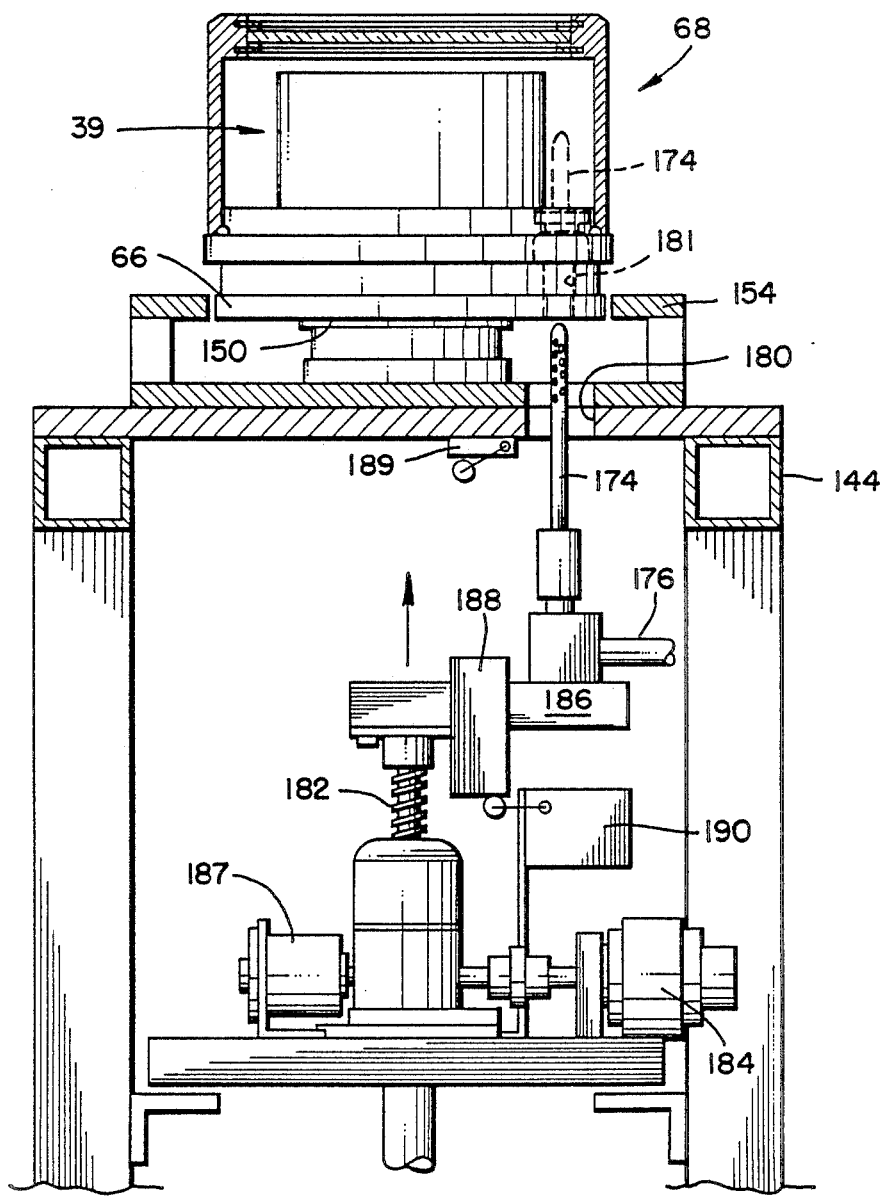
FIG. 11 is a front elevation view at another operating position of the system illustrating apparatus for injecting an inert gas into the interior of a dome member.
Figure 12:
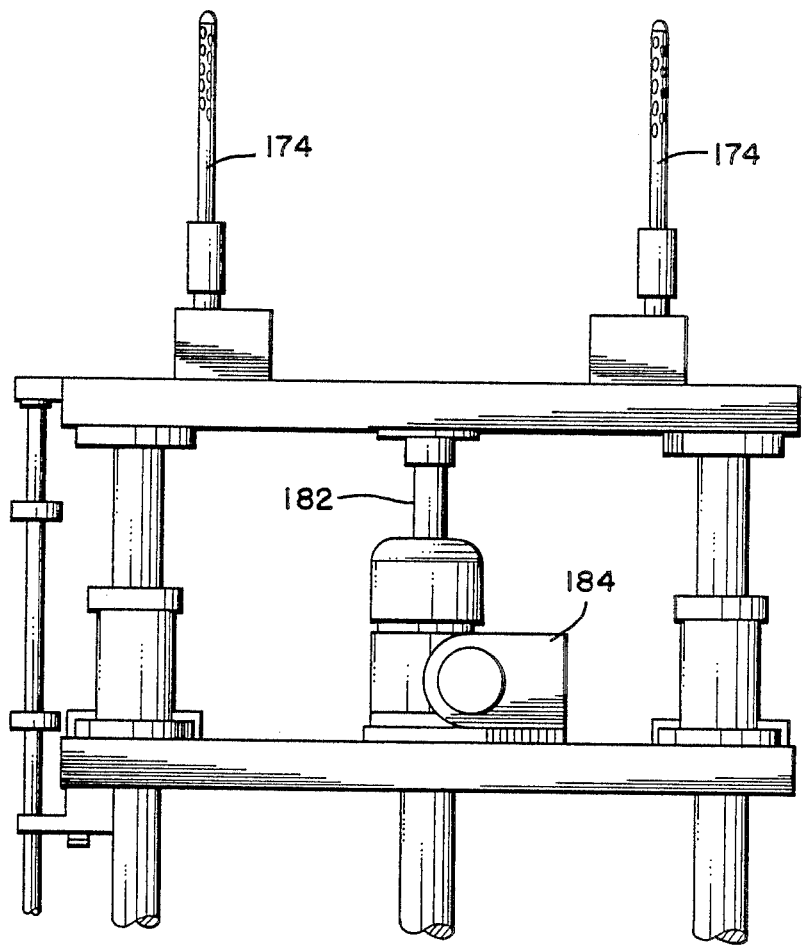
FIG. 12 is a side elevation view of the apparatus illustrated in FIG. 11.

It will be appreciated that it is customary, although not required, for each of the tandem depressions 140 to supportingly receive a fixture 64 and its associated assembly 39 and dome member 68. Accordingly, the nitrogen injection station 70 is equipped with a pair of bullet nosed needle injectors 174 (FIGS. 11 and 12), each attached via a conduit 176 (FIG. 11) to tanks 178 (FIG. 1) of compressed nitrogen gas positioned approximate to the nitrogen injection station. Suitable apertures 180 are provided in the frame structure 144 of the conveyor to freely receive therethrough the needle injectors 174 and enable their movement between a retracted position as illustrated by solid lines in FIG. 11 to an advanced position as illustrated by dotted lines. The pallet 66 also has a pair of associated apertures 181 which similarly accommodate movement therethrough of the injectors 174. The apertures 181 are aligned with the apertures 180 when the pallet is properly positioned within station 70.

A screw jack 182 mounted on the frame support structure 144 in a suitable fashion is driven upwardly and downwardly by a source of power such as an air motor 184. The screw jack 182 serves to raise and lower a support plate 186 on which the injectors 174 are suitably mounted. A brake 187 serves to hold the screw jack 182 and its associated needle injectors 174 in its advanced position for a predetermined length of time until it is desired to return the needle injectors to the retracted position. The control console 36 for the system 30 is informed that the needle injectors 174 have reached their advanced positions when actuator arm 188 integral with the support plate 186 engages a limit switch 189. This in turn, deactivates the motor 184. Similarly, when the actuator arm 188 engages a limit switch 190, as movement proceeds downwardly, the control console is informed that the needle injector 174 has moved to a fully retracted position and, again, the motor 184 is deactivated.

Figure 6:
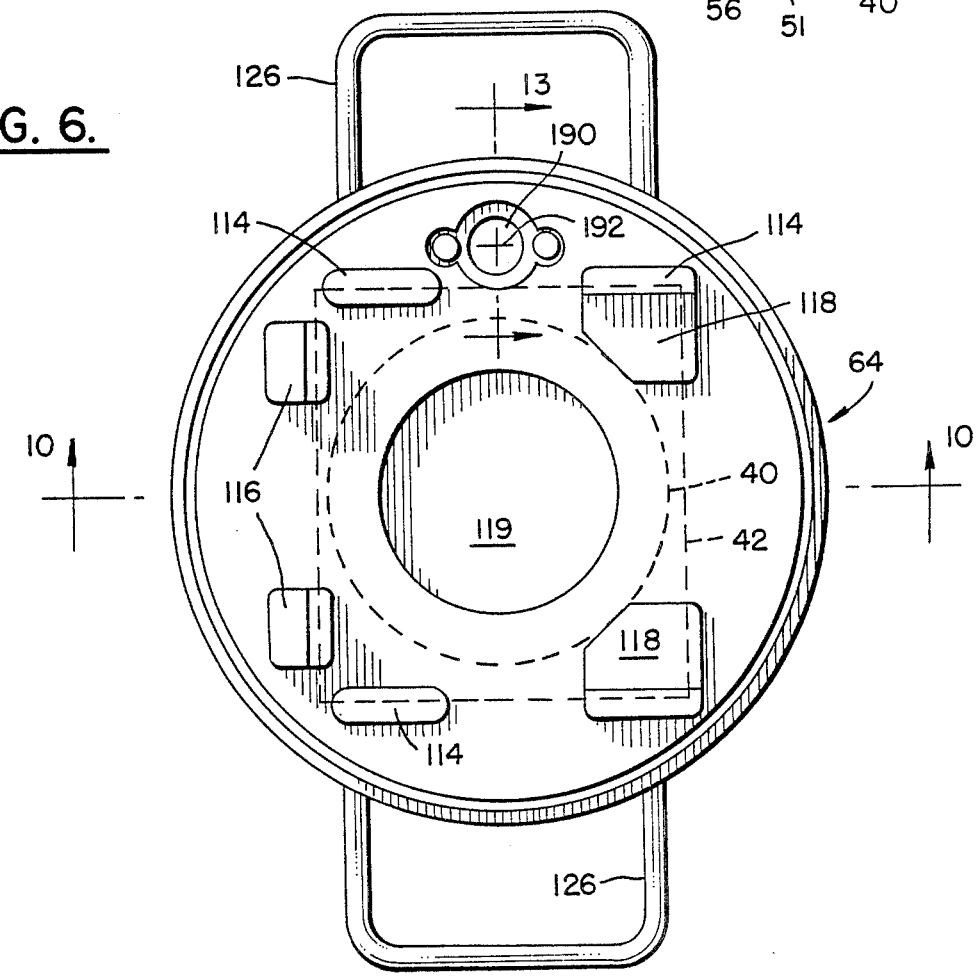
FIG. 6 is a top plan view of a fixture used by the invention and illustrating thereon in phantom an assembly comprised of a core member and a housing.
Figure 13:
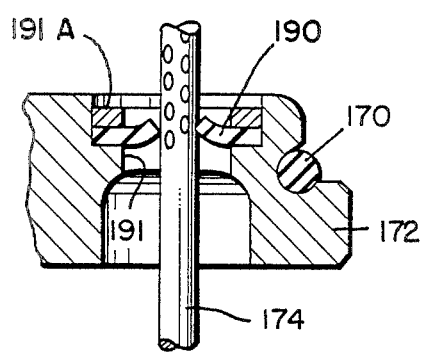
FIG. 13 is a detail cross section view taken along line 13—13 in FIG. 6 and illustrating an injector extending through a sealing diaphragm for injection of inert gas performed at another operating position of the system.

With reference now especially to FIG. 13, it is seen that as the needle injector 174 is elevated towards its advanced position, its bullet nose first engages, then pushes aside, a resilient diaphragm 190. The diaphragm normally covers an orifice 191 which extends from a bottom surface of the fixture 64 to the top surface 112 thereof. It is held in place by a suitable ring 191A and is preferably composed of a closed cell sponge rubber material. The diaphragm has a cruciform shaped slitted opening 192 formed therein (see especially FIG. 6), by reason of which the material of the diaphragm 190 is pushed aside by the needle injector, yet adheres closely to the needle injector. When the needle injector is fully advanced, a quantity of nitrogen gas is injected into the inner region mutually isolated by the dome member 68 and the fixture 64. The quantity of the gas injected preferably has twice the volume of the inner region so isolated. This causes the original, or ambient, atmosphere of air within the dome member to be exhausted through the diaphragm 190. After a predetermined period of time, which is dependent upon the volume within the dome member 64 and the rate of flow of nitrogen gas through the needle injector 174, the resulting atmosphere within the dome member, isolated from the surrounding atmosphere, will be substantially 100% nitrogen gas. When the injector 174 is subsequently withdrawn to the retracted position, the diaphragm 190 also returns to its original sealing condition, effective to retain the new. inert atmosphere within the dome member 68. It is noteworthy that excessive pressures, should they occur, will be automatically exhausted through the o-ring seal 170 which serves as a safety valve. An inert atmosphere can thus be provided for the assembly 39 in an economical manner and requiring a relatively small volume of inert gas.

The purpose for the nitrogen injection station 70 is to provide an inert atmosphere for each assembly 39. Such an atmosphere substantially enhances the effectiveness of the ultraviolet radiation to be provided at zone 72 for curing the bead of sealant which was applied to the assembly at the station 60. The nitrogen injection thereby enables a shortened curing time which, in turn, leads to more efficient and economical operation performed by the overall system 30. While nitrogen is a preferred gas to employ for purposes of the invention, numerous other insert gases, or mixtures of gases, or gaseous compounds can be utilized for the same purpose.

After the predetermined time lapse for performing the operation at the nitrogen injection station 70, a subsequent stop gate 156E is moved to the withdrawn position as are successive stop gates 156F, 156G, 156H, and 156I, all of which are associated with the ultraviolet radiation zone 72. Throughout operation of the system 30, appropriate sensing mechanisms (not shown) are operated to assure that only one pallet 66 is positioned between successive stop gates 156. Hence, stop gate 156D is not moved to the inactive position until after the pallet presently in the nitrogen injection station 70 moves beyond the stop gate 156E. Thereupon, at substantially the same time, stop gate 156F is moved from an inactive position to the active position to engage the front side of the advancing pallet and the stop gate behind that pallet, namely, stop gate 156E is likewise moved to the active position so as to engage the front side of the next pallet in succession. Furthermore, when that pallet engages the stop gate 156E, the stop gate 156D is moved to the active position to engage the front side of the pallet now positioned at the nitrogen injection station 70. Thus, all of the stop gates 156 of the system 30 are moved relative to one another by an appropriate control system which assures economy of operation while simultaneously guards against collisions between pallets and against situations where two pallets attempt to occupy the same station between successive stop gates and thereby cause a traffic jam.

According to the arrangement illustrated in FIG. 1, then, it will be evident that as many as three pallets 66 may be properly positioned simultaneously in the ultraviolet radiation zone 72. This is in addition to possible positioning of two additional pallets immediately adjacent the radiation zone 72, namely, one pallet about to enter the radiation zone and another pallet having just left the radiation zone. This arrangement results partially from the fact that the time necessary to cure a bead of sealant such as the bead 62, may be, for example, 45 seconds which is approximately three times the time lapse generally necessary for performing operations at other stations of the system 30. As a result, it has been determined as desirable, in order to assure the continuity of the system, to arrange three stop gates 156 within the zone 70, with a pallet remaining at each station within the zone for an increment of time equal to one third of the total time necessary to achieve a cure, or approximately 15 seconds per station.

Additionally, while ultraviolet radiation as provided in the zone 72 is highly desirable for effecting a cure of the bead of sealant, it can have deleterious effects on the surrounding environment, as is well known. Hence, it is necessary to contain the radiation within the zone 72 and not allow its escape. For this reason, as each pallet 66 approaches the radiation zone 72, it must pass through two sets of doors, 194 and 196, respectively, which are positioned at opposite ends of a short tunnel 198 immediately proceeding entry into the ultraviolet radiation zone 72. Furthermore, when the set of doors 194 is open, the set of doors 196 must be closed, and vice versa. In this manner, escape of ultraviolet radiation from the zone 72 is prevented at its upstream end. In a similar fashion, similar sets of doors 200 and 202, respectively, are found at opposite ends of a short tunnel 204 (FIG. 14) and operate in the same relative manner as the sets of doors 194, 196 to assure that there is no escape of ultraviolet radiation from the downstream end of the radiation zone 72.

Figure 14:
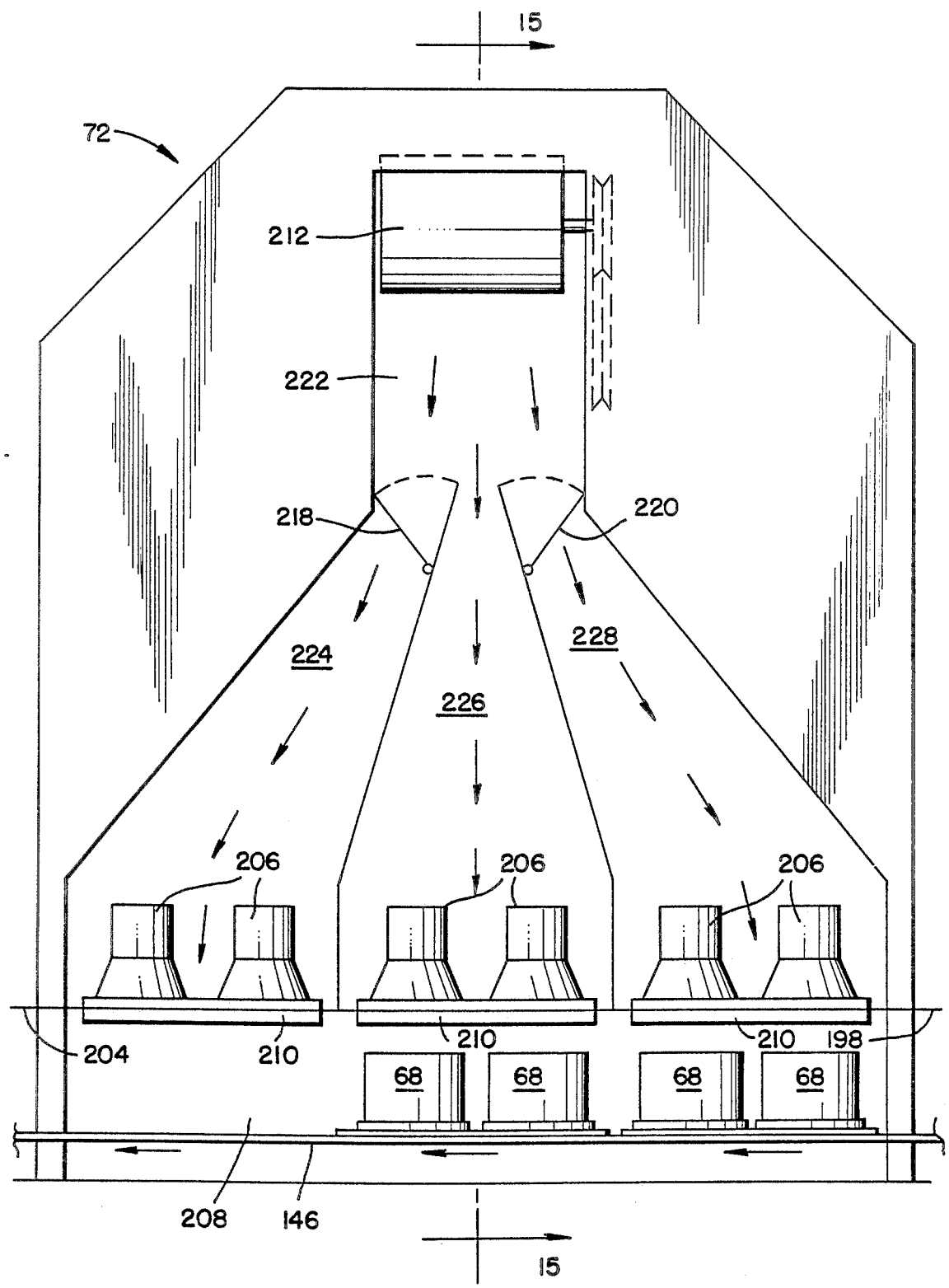
FIG. 14 is a diagrammatic side elevation view illustrating another operating position of the system at which pallets with assemblies positioned thereon are exposed to ultraviolet radiation.
Figure 15:
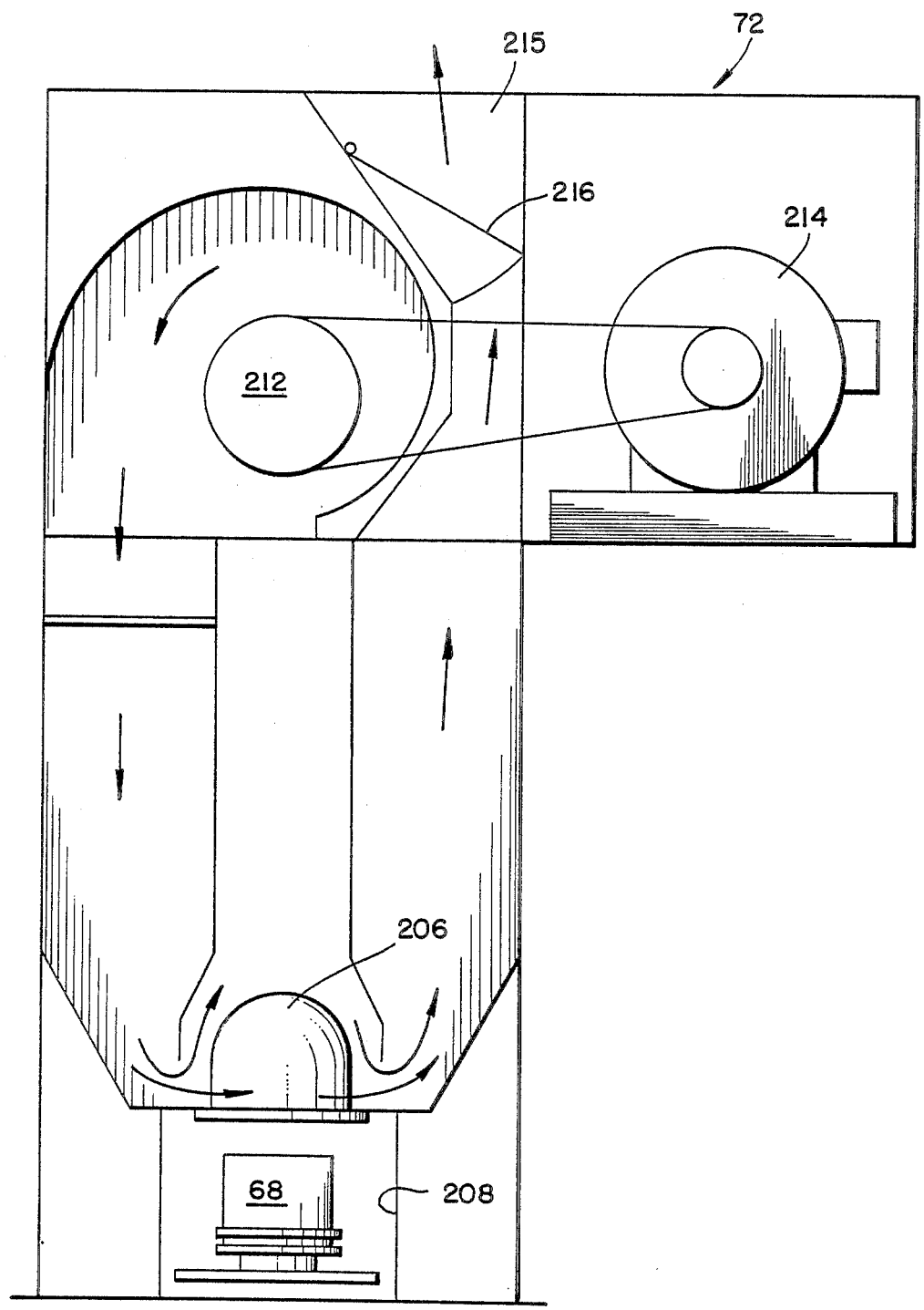
FIG. 15 is a diagrammatic cross section view taken generally along line 15—15 in FIG. 14.

Referring to FIGS. 14 and 15, the radiation zone 72 comprises three successive pairs, in tandem, of ultraviolet lamps 206. These lamps 206, may be, for example, ozone free, long wave, ultraviolet sources such as UVALOC 400 lamps currently available from Loctite Deutschland, Munich, West Germany. The lamps are positioned to project their radiation downwardly into a radiation tunnel 208 through which the pallets 66 and their associated cargo advance on the movable element 146. Two lamps 206 are positioned at each station, that is, between successive stop members 156.

To guard against potential undesirable interaction between the ultraviolet radiation produced by the lamps 206 and various gaseous compounds and impurities which may be present in the surrounding atmosphere passing through the tunnel 208, a suitable window arrangement 210 with appropriate seals (not specifically shown) is provided for each pair of lamps 206. In addition, a large capacity blower 212 suitably driven by a motor 214 directs cooling air drawn in from a remote location, under positive pressure, down and around each of the lamps 206. This cooling air eventually exhausts through an outlet 215 which is controlled by a suitably operated damper 216. The damper 216 mainly enables temperature control but also aids in the control of the pressure surrounding the lamps 206. The positive pressure thereby produced by the blower 212 adds further assurance that there will be no impurities in the region of the lamps 206. Because any leakage would be outwardly directed, no ambient dust or vapor is undesirably drawn into the region of the lamps. Suitably operated valves 218 and 220 are employed to regulate and generally balance the air flow at the juncture between a manifold 222 and ducts 224, 226, and 228 to each respective pair of lamps 206. Of course, it will be appreciated that other methods of cooling including those utilizing liquids could be satisfactorily employed.

A number of significant benefits are derived from use of the radiation zone 72 as described. For example, dry to touch surface cures of the bead of sealant are produced in a fraction of the time normally required when curing without an inert atmosphere. Of course, as previously mentioned, nearly perfect inert atmospheres can be economically created within the small volume of the confinement chamber as defined by the dome member 68. Furthermore, the hazard of suffocation to personnel which was previously present when creating less confined inert atmospheres, has been eliminated. Also, the high cost of maintaining inert atmospheres is significantly reduced by reason of the present invention. Additionally, by reason of the present design, personnel are not subjected to the eye and skin hazards previously associated with use of ultraviolet radiation. Then, too, lower ultraviolet energy requirements and shorter exposure times are possible by reason of the inert atmosphere system and result in lower surface temperatures being generated on the parts being cured. As a typical comparison of energy requirements, it is note worthy that dry to touch surface cures can be produced by the present invention with less than half the ultraviolet energy, or approximately 50,000 mw/cm$^2$ while prior art processes not utilizing an inert atmosphere required double that energy for the same length of time.

After a pallet 66 and its associated cargo pass, sequentually, beyond each of the successive stop gates 156F, 156G, 156H, and 156I, it is advanced by the movable element 146 until it reaches and is stopped by a stop gate 156J. At this point, if there is no pallet in the next succeeding station, the gate 156J is moved to the inactive position allowing the pallet to advance once again until it is then stopped by a gate 156K which is in the active position. As previously, when the front side of the pallet engages the stop gate 156K, the gate to its rear, namely 156J, is returned to the active position to assure that no subsequent pallet moves into the station 74 while the present pallet is so positioned.

Figure 16:
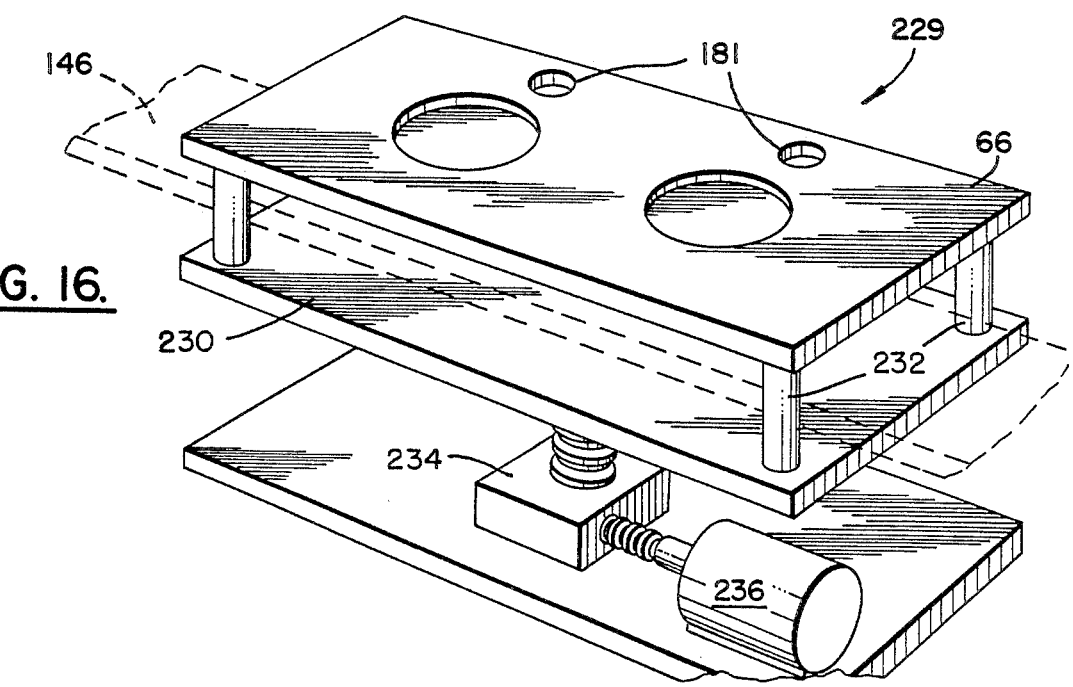
FIG. 16 is a diagrammatic perspective view of a lifting mechanism for raising and lowering a pallet at certain operating positions of the system of the invention.

In order to perform the operation at the dome member removal station 74, it is necessary to raise the pallet 66 and its cargo to an elevation substantially above the conveyor 32. To accomplish this, a lifting mechanism 229 is utilized, as generally illustrated in FIG. 16. The lifting mechanism 229 includes a platform 230 positioned beneath the movable element 146 of the conveyor and lies in a plane generally parallel to the movable element. However, the platform 230 has at least four upstanding support members 232 adjacent its outermost edges. As seen in FIG. 16, these upstanding support members are mounted on the platform 230 at spaced locations in the direction of movement of the movable element 146 and lie in spaced apart planes on opposite sides of the conveyor and spaced outwardly of the movable element 146. Screw member 234 is operable to move the platform 230 between a raised position as indicated in solid lines in FIG. 16 and a lowered position. A suitable drive mechanism, such as an air motor 236 serves to operate the screw member 234. As illustrated in FIG. 9, the support members 232 extend through openings 238 in the frame 144 of the conveyor 32 as they move to engage the pallet 66. As illustrated in FIG. 16, as the platform 230 is raised, the upper ends of the support members 232 engage and located the pallet 66 and cause it to be raised above and out of engagement with the movable element 146.

Figure 17:
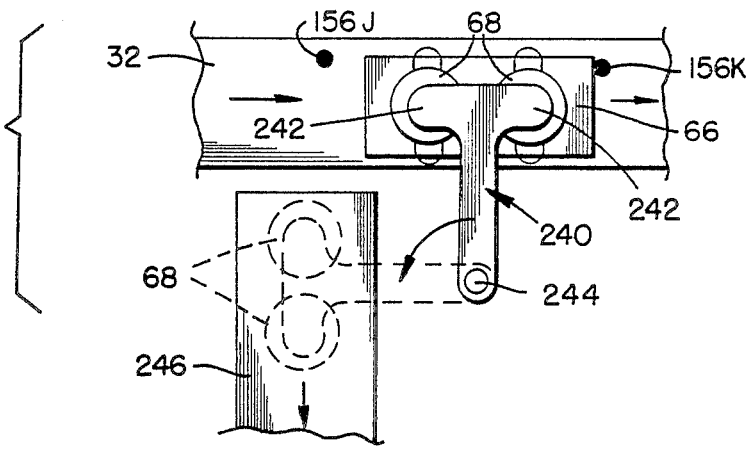
FIG. 17 is a detail diagrammatic plan view of a mechanism for removing dome members from a pallet at another operating position of the system and transferring them to a dome member return conveyor.

With the pallet so raised at station 74, the dome members 68 are moved into engagement with a suction head 240 which has a pair of suitable suction elements 242, each engageable with an associated dome member 68. Suction is then applied to the elements 242 causing them to firmly engage the dome members 68. Thereupon, the pallet 66 is lowered to its idling position by the lifting mechanism 229. Firmly engaging and supporting the dome members 68, the suction head 240 is then swung about a pivot 244 from the solid line position to the dotted line position thereby causing the dome members 68 to overlie the dome member return conveyor 76. The conveyor 76 is a continually operating component of the system 30 and serves to return dome members 68 to the assembly bench area 38 for future placement on a fixture 64. With the dome members positioned as illustrated in FIG. 17 by dotted lines, suction to the elements 242 is terminated and the dome members drop a short distance to the surface of the conveyor 76. The suction head 240 is then swung back to its solid line position overlying the conveyor 32 to await delivery of the next pallet 66 into the station 74. At the same time, the dome members 68 proceed on the conveyor 76 to the assembly bench area 38.

Figure 18:
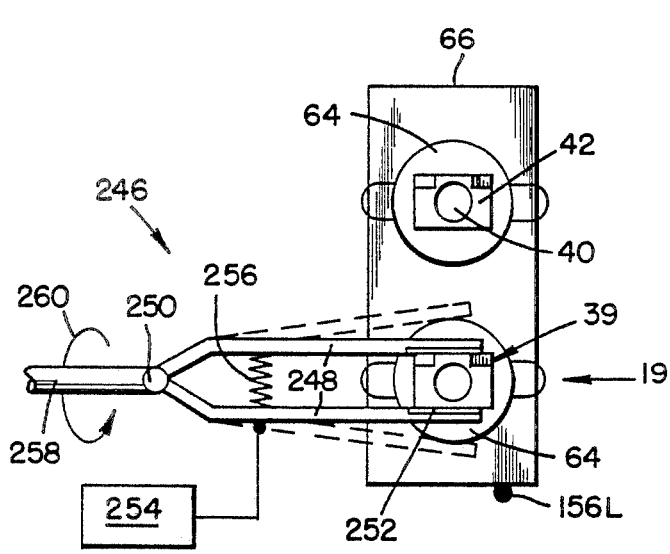
FIG. 18 is a detail diagrammatic top plan view of a mechanism at another operating position of the system both for inverting a core and housing assembly.
Figure 20:
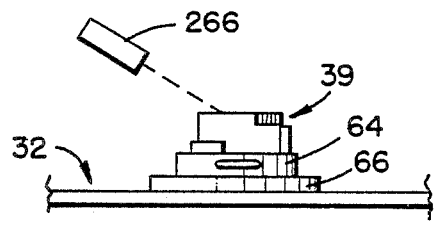
FIG. 20 is a detail diagrammatic side elevation view, similar to FIG. 19, illustrating a sensor arranged to detect whether or not a bead of sealant is located on top of the core and housing assembly after the inversion step performed in FIG. 19.

When the dome member removal operation is completed, the stop gate 156K is withdrawn to its inactive position enabling the pallet 56 to proceed to the assembly inversion station 78 where it is engaged by a stop gate 156L (see FIG. 18). Thereupon, the stop gate 156K is again raised to its active position to prevent a following pallet from entering the station. With the pallet 66 so engaging the stop gate 156L, operation of an inversion mechanism 246 is initiated.

As seen in FIG. 18, the inversion mechanism 246 includes a pair of elongated arms 248 which extend transverse of the pallet and overlie it. Another lifting mechanism 229, similar in all respects to the lifting mechanism just described for use at the station 74, is likewise effective to raise the pallet 66 at the station 78. This raising of the pallet serves to move the first or forward assembly 39 thereon into the plane of the arms 248. It will be understood that no operations are performed at the station 78 on the second or rear assembly 39. This is for the reason that all operations on the second or rear assembly have been completed by the time station 78 is reached and that said assembly is merely awaiting removal from the system.

The arms 248 are constructed to swing about a pivot 250 between an open position as indicated by dotted lines and a closed position engageable with the assembly 39 as indicated by solid lines. The extremities of the arms 248 may be provided with frictional pads 252 to aid in engaging and holding the assembly 39. A suitable operating mechanism such as a solenoid 254 may be used to open and close the arms 248 about the pivot 250 and a tension spring 256 extending between the arms 248 serves to bias the arms toward the solid line, or closed, position.

Figure 19:
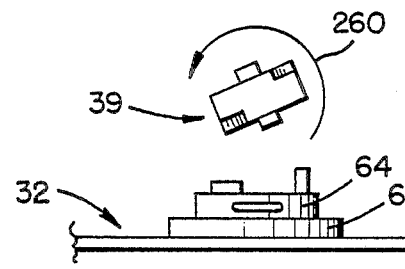
FIG. 19 is a detail diagrammatic side elevation view of the mechanism illustrated in FIG. 18 and illustrating the inversion step.

When the arms 248 solidly grip the assembly 39, the lifting mechanism 229 operates to return the pallet 66 to its idling position on the conveyor 32. Then, as illustrated in FIGS. 18 and 19, the arms 248 are rotated on a suitable shaft 258 in the direction of an arrow 260. The shaft 258 rotates through an arc of 180° so as to reverse the position of the assembly 39 on the fixture 64 and on the pallet 66. Thus, with reference momentarily to FIG. 2, whereas previously the notched out regions 122 and 124 had engaged the registration elements 118 on the fixture 64, after rotation, oppositely facing notched out re9ions 262 and 264 will engage the registration elements 118.

A purpose of this inversion step is to place the first bead of sealant 52 on the bottom of the assembly 39 as it continues through the system 30 and thereby expose the cavity 58 for filling at the next station 80 with the anaerobic bonding material 82.

When the assembly 39 has been fully inverted, the lifting mechanism 229 again raises so that the assembly can be received once again on the fixture 64. Again, the solenoid 254 is operated to withdraw the arms 248 from engagement with the assembly whereupon the lifting mechanism again retracts and returns the pallet 66 and its cargo to the conveyor 32.

Before the pallet 66 again proceeds to the next station a suitable sensing mechanism 266 which is generally directed at the cavity 58 is operable to determine whether or not a bead of sealant 62 is present. If a bead of sealant is present, that indicates that the inversion operation has not been successful and an appropriate signal is transmitted to the control console 36 and the system 30 is temporarily shut down until an operator can correct the problem. If the sensing mechanism 266 fails to sense a bead of sealant then that failure indicates the inversion operation was a successful one. In this event, operation of the system 30 continues in an uninterrupted fashion. Thereupon, the stop gate 156L is moved to its inactive position allowing the pallet 66 to once again proceed on the movable element 146 until the leading edge of the pallet 66 engages a stop gate 156M. The stop gate 156L then returns to its active position to prevent another pallet from simultaneously entering the same station. When the station 80 becomes clear of a pallet the stop gate 156M is then moved to its inactive position allowing the pallet to enter the dispensing station 80. The pallet then engages a stop gate 156N and the stop gate 156M is returned to its active position to prevent any further entry into the station 80 of a following pallet.

Figure 21:
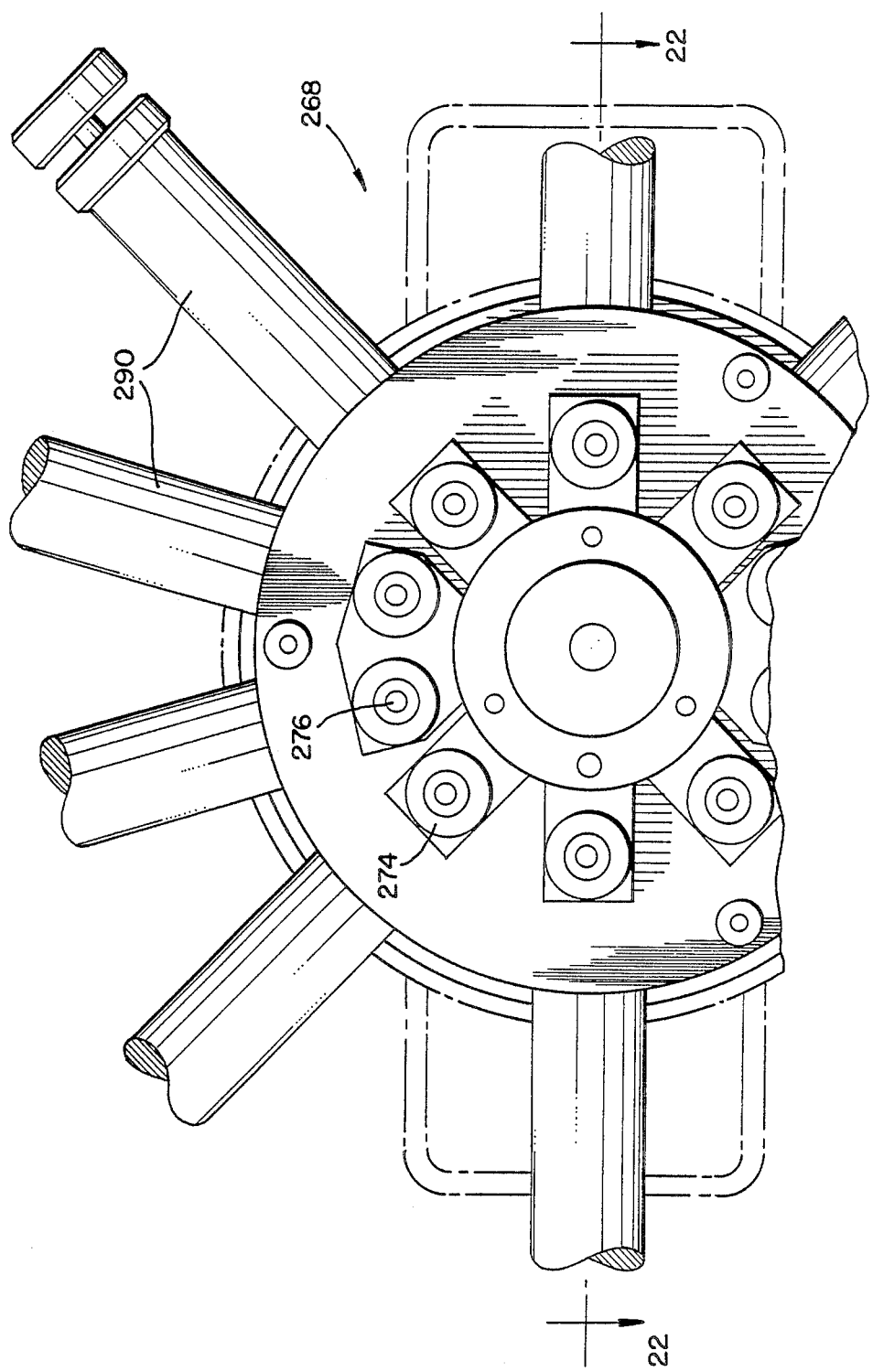
FIG. 21 is a top plan view of a dispenser of anaerobic bonding material which is located at another operating position of the system of the invention.
Figure 22:
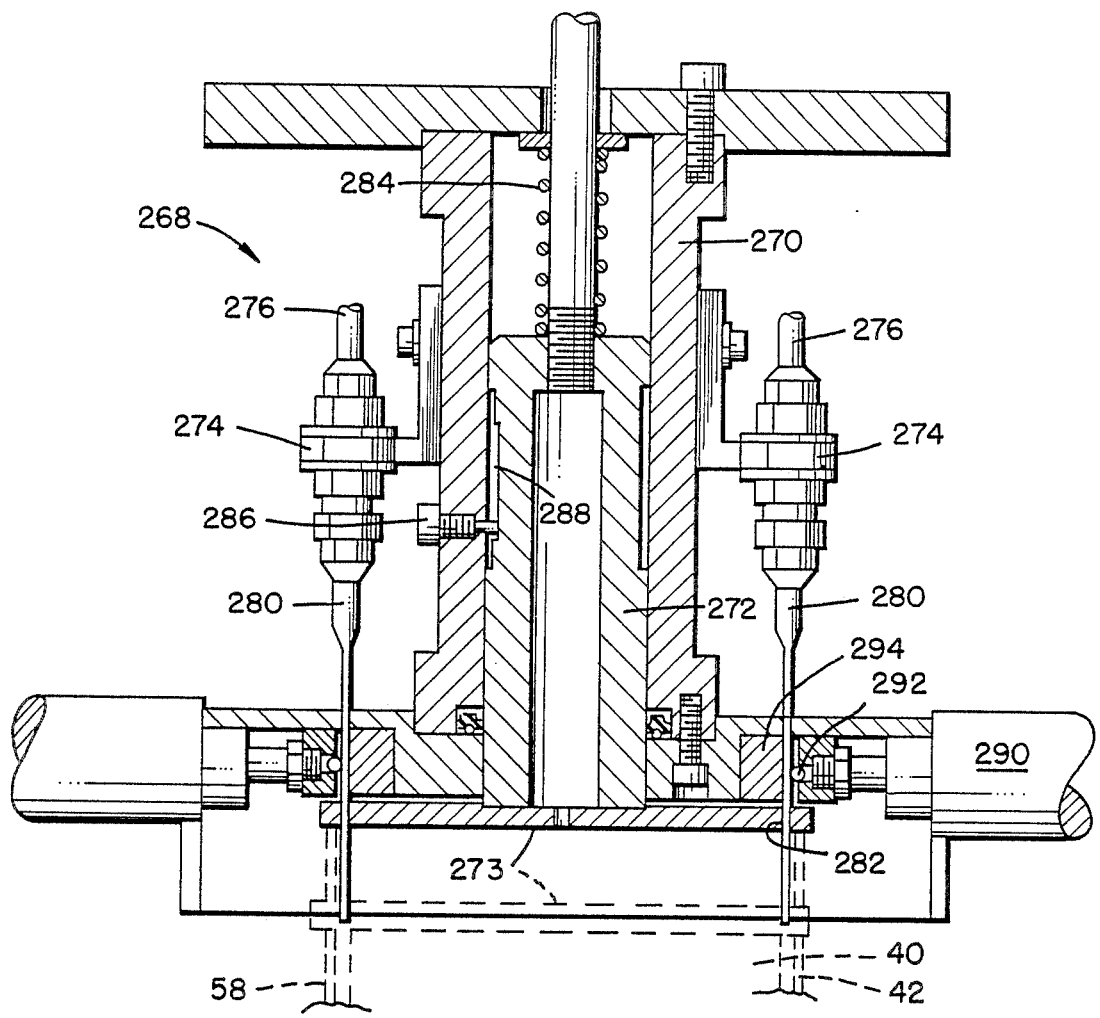
FIG. 22 is a cross section view taken generally along line 22—22 in FIG. 21.
Figure 23:
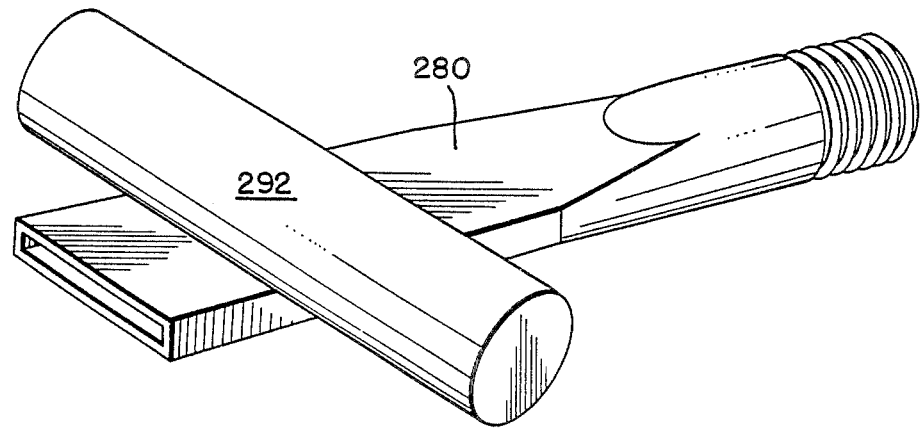
FIG. 23 is a detail perspective view illustrating a nozzle mechanism utilized by the apparatus illustrated in FIGS. 21 and 22.

Turn now to FIGS. 21-23 which illustrate a dispensing apparatus 268 employed at the station 80. Specifically, the apparatus 268 operates to dispense into the cavity 58 the anaerobic bonding material 82, one example of which is manufactured and sold by Loctite Corporation under Loctite Part No. 190035. Loctite Part No. 190035 is a proprietary anaerobic adhesive which cures rapidly through large gaps using a primer and also cures in ultraviolet light to produce dry fillets. As previously explained, the composition applied to the core member and to the housing member at the primer station 44 serves to activate the cure of the bonding material 82. Furthermore, it is necessary to explain, for a more complete understanding of the invention, that cure of the bonding material only takes place in the absence of air.

As seen particularly well in FIG. 22, the dispensing apparatus 268 includes a stationary mounting structure 270 on which is slidably received a plunger 272 to the lower end of which is fixed a nozzle guide plate 273. Circumferentially mounted on the structure 70 are a plurality of fluid couplings 274 which, through conduits 276, are connected to the reservoir 278 (FIG. 1) of the anaerobic bonding material.

To the opposite end of each fluid coupling 274 is attached a duck bill dispensing nozzle 280 which is of a suitable pliable plastic material such as a high density polyethylene material. One example of a suitable material is known as "Chemplex", part no. 5003, supplied by Northern Petrochemical Company, Rolling Meadows, Ill. The dispensing nozzles extend downwardly through appropriate apertures in the mounting structure 270, then through circumferentially located openings 282 in the nozzle guide plate 273. While the openings 282 loosely receive the nozzles 280, they serve as guides for the nozzles in the manner to be described below and further prevent any substantial movement of the ends of the nozzles in a lateral direction. A compression spring 284 is positioned between the mounting structure 270 and the plunger 272 and urges the plunger in a downward direction. A stop screw 286 is threadedly engaged with the mounting structure 270 and extends into a longitudinally extending slot 288 in the plunger 272. The ends of the slot 288 are engageable by the screw 286 to define the limits of movement of the plunger 272. The elevated position of the plunger 272 is illustrated by solid lines in FIG. 22 and its depressed position, under bias of the spring 284, is indicated by the position of the nozzle guide plate 273 as shown by dotted lines. It is noteworthy that when the nozzle guide plate 273 is in its fully depressed position, it continues to engage the lower extremeties of the nozzles 280.

Flow of fluid through the nozzles 280 is controlled by means of an air operated actuator 290 or other suitable mechanism which in its normally deenergized state moves a dowel element 292 into engagement with the nozzle and against an anvil 294 integral with the mounting structure 270. Thus, when the actuator 290 is deenergized, the dowel 292 is effective to shut off flow through the nozzles 280. It is only when the actuators 290 are energized that fluid is permitted to flow through the nozzles.

Another embodiment of the dispensing apparatus 268 is possible. For instance, the duck bill dispensing nozzle 280 can be made in the same or similar configuration of stainless steel or other similar material. In this embodiment, a suitable dispensing valve such as Loctite part no. 95427944, provided by Loctite Corporation, Newington, Conn. can be placed between reservoir 278 and conduit 276 to control the supply of bonding material 82 to the nozzle 280. In accordance with this variation, the dispensing valve is operated pneumatically and air-operated actuator 290 should be disabled or removed since it is not needed in this dispensing embodiment.

Another lifting mechanism 229 having the construction of those used at stations 74 and 78 is also utilized at the instant station 80. As the pallet 66 is raised, the uppermost surface 51 of the core member 40 engages the lowermost surface of the nozzle guide plate 273 as the latter assumes the dotted line position seen FIG. 22. As the lifting mechanism continues to rise, the core 40 continues to bear against the nozzle guide plate 273 and eventually moves it to its solid line or elevated position (FIG. 22). With such upward movement of the assembly 39 relative to the mounting structure 270, the lowermost ends of the nozzles 280 are radially disposed so as to enter the cavities 58 and continue to slide into the cavities until they descend to approximately one-half the depth thereof. At this point, the assembly 39 will have been raised to its upper most position.

Figure 24:
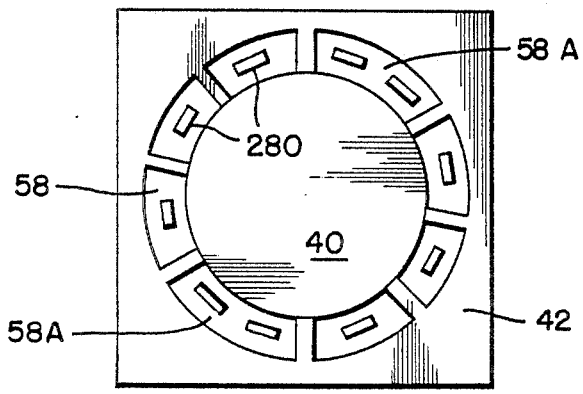
FIGS. 24 and 25 are diagrammatic top plan views illustrating, respectively, different orientations of dispensing nozzles within the cavity between a core member and a housing member.

As seen in FIG. 24, there are a total of ten dispensing nozzles 280 and, by reason of the ribs 52, there are actually six cavities 58, each receiving one nozzle. However, there are two additional cavities 58A which receive two nozzles each. This arrangement reflects a situation in which the cavities are of a complex shape and require additional nozzles in order to assure the proper amount and placement of the bonding material therein When the assembly 39 has achieved the elevated position, a programmed control system is operated according to which the actuators 90 are operated to allow the anaerobic bonding material to commence flow through the nozzles and into the cavity 58. The lifting mechanism 229 begins to descend at a proper rate consistent with the flow rate of the nozzles 280 and the magnitude of the cavities 58 and 58A. As the assembly 39 descends, the nozzle guide plate 273 continues in engagement therewith under the bias of the spring 284. This serves to stabilize the assembly on the pallet 66 during the dispensing operation. After a predetermined time period, when the lower extremeties of the nozzles 280 are near a terminal region of the collective cavities, the actuators 290 are deenergized and flow of the bonding material through the nozzles 280 is terminated. At that time point, the lifting mechanism 229 returns the pallet 66 to the the conveyor.

The stop gate 156N is then drawn downwardly to the inactive position to enable the pallet and its cargo to proceed on the conveyor 32. After the pallet leaves the station 80, the stop gate 156N returns to its active position and the pallet 66 proceeds to a stop gate 156A which, in its active position, prevents further movement of the pallet 66 until an appropriate future time.

Figure 25:
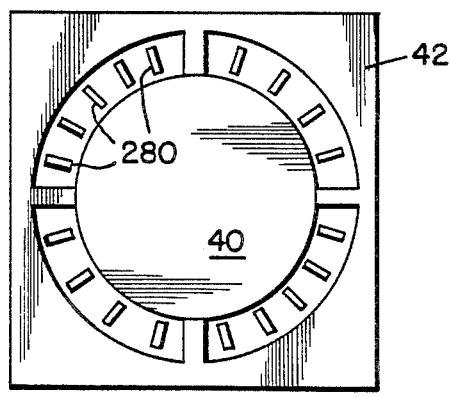

It is noteworthy that the nozzles 280, as illustrated in FIG. 24 have their long cross sectional dimensions lying generally in a circumferential plane. In certain applications, however, it may be desirable to increase the density of the nozzles 280 by placing them in radial planes as illustrated in FIG. 25. In either event, the dispensing apparatus 268 provides the ability to dispense large volumes of a fluid or semifluid material into thin deep cavities and to control the flow of the material at each nozzle. By reason of the invention, a large volume of material can be dispensed in a short interval of time and at lower pressures within confined areas.

Up to the present time, discussion has centered on the assembly 39 which is placed in the first or forward position on the pallet 66. As previously explained, the operator transfers a virgin core member 40 and a virgin housing member 42 into the priming station 44 for the operation which has previously been described.

As seen in FIG. 4B, the pallet 66 then proceeds until it engages the stop gate 156B. While here, as illustrated in FIG. 4B, a completed assembly 39 is removed from the fixture 38 and placed onto the cart 88. At this position, the fixture 64 remaining in the rear or second position on the pallet 66 after the completed assembly 39 is placed onto cart 88 is removed from the pallet and placed in the press station 46 for mating with the core member 40 and housing member 42 which has just previously completed the priming operation.

After operations are performed which are depicted in FIG. 4C as previously explained, and after the stop gate 156B has moved to an inactive position, the pallet 66 proceeds to, and is engaged by, a stop gate 156C. While at this location, the assembly 39 and its associated fixture 64 are moved to a second bead station 84 which is identical in all respects with the first bead station 60 In this operation, a second bead of sealant 86 is applied at a terminal region of the cavity 58 thereby totally isolating the anaerobic bonding material 82 which had previously been dispensed into the cavity at the station 80. At this point, the bonding material 82 is able to proceed with the curing process.

As indicated FIG. 4E, the assembly 39 to which the second bead of sealant 86 has just been applied at the second bead station 84 is then removed together with its fixture 64 and placed in the pallet at the second or rear location. The first or forward position of the pallet 66 is now occupied by the new assembly.

The pallet now proceeds through the nitrogen injection station 70 and the ultraviolet radiation zone 72 for curing the second bead of sealant 86. Thereafter, the pallet proceeds to the dome member removal station 74, then to the assembly inversion station 78 at which the second position assembly 39 is merely a spectator. Similarly, the second position assembly is merely a spectator at the dispensing station 80. Finally, when the pallet proceeds to the stop gate 156B, the completed assembly is removed and placed on the cart 88.

While the preferred embodiments of the invention have been disclosed in detail, it should be understood by those skilled in the art that various modifications may be made to the illustrated embodiments without departing form the spirit and the scope thereof as described in the specification and defined in the appended claims.

We claim:

1. Apparatus for bonding a core member to a housing member wherein the core member has upper and lower surfaces and an outer peripheral surface extending between the upper and lower surfaces thereof and wherein the housing member has upper and lower surfaces and an inner peripheral surface extending between the upper and lower surfaces thereof defining a opening extending therethrough, the opening being spaced from the outer peripheral surface of the core member to thereby define an annular cavity therebetween having first and second spaced terminal regions, said apparatus comprising:

first dispensing means for applying a first continuous bead of viscous sealant to the inner and outer peripheral surfaces at a first terminal region of the cavity;

operative means for subjecting the first bead of sealant to a nitrogen atmosphere;

electromagnetic wave generation means for curing the first bead of sealant;

second dispensing means for substantially filling the cavity with anaerobic bonding material;

said first dispensing means being operable to apply to a second continuous bead of viscous sealant to the inner and outer peripheral surfaces at the second terminal region of the cavity spaced from the first terminal region and contiguous with an exposed surface of the anaerobic bonding material to thereby isolate the anaerobic bonding material within the cavity;

said operative means being operable to subject the second bead of sealant to a nitrogen atmosphere; and said electromagnetic wave generation means being operable for curing the second bead of sealant.

2. Apparatus as set forth in claim 1 wherein said operative means includes a dome member for enveloping an assembly composed of the housing member and the associated core member, said dome member having a lower rim engageable with a continuous circumferential seal member on an upper surface of a fixture for supporting the dome member to thereby isolate the assembly from the surrounding atmosphere.

3. Apparatus as set forth in claim 2 including first conveyor means for advancing an assembly and its associated fixture and said dome member thereon toward and through a plurality of stations including a dome member removal station;
- a suction head engageable with said dome member as said dome member is positioned at said dome member removal station;
- said suction head being selectively connected to a source of vacuum and overlying said first conveyor means in a plane higher than said dome member;
- lifting means movable sequentially from a normallly withdrawn position to an extended position for raising said dome member into engagement with said suction head, then again to said withdrawn position;
- said suction head being effective to support said dome member when said lifting means is returned to said withdrawn position; and
- a second conveyor means for moving said dome member to a dome member storage area;
- said suction head being movable between a position overlying said first conveyor means to a position overlying said second conveyor means to deliver said dome member thereto for movement to said dome member storage area.

4. Apparatus as set forth in claim 3 wherein said first conveyor has a movable element for advancing a pallet engageably supported thereon which is wider than the movable element, the pallet supporting thereon the assembly and its associated fixture and said dome member thereon, said apparatus including:
- a platform positioned beneath said first conveyor lying in a plane generally parallel to the movable element and having a width greater than the movable element;
- at least four upstanding support members mounted on said platform at spaced locations in the direction of movement of the movable element and lying in spaced apart planes on opposite sides of said first conveyor and spaced away from said movable element;
- screw member operable to move said platform between raised and lowered positions;
- drive means for operating said screw members; and
- upper ends of said support members being engageable with the pallet as said platform is raised and causing said pallet to be raised above and out of engagement with said movable element when said platform is moved to its raised position.

5. Apparatus as set forth in claim 4 including gate means selectively engageable with the pallet to restrain it against movement on said conveyor while the pallet is positioned at said dome member removal station.

6. Apparatus as set forth in claim 2 including removal means for removing said dome member from the fixture to thereby enable access to said assembly.

7. Apparatus as set forth in claim 2 including:
- first conveyor means for advancing a plurality of successive assemblies and their associated fixtures and said associated dome members thereon toward and through a plurality of stations including a dome member removal station;
- a suction head engageable with a pair of said dome members overlying a pair of associated successive assemblies as said dome members are positioned at said dome member removal station;
- said suction head being selectively connected to a source of vacuum and overlying said first conveyor means in a plane higher than said dome members;
- lifting means movable between a normally withdrawn position and an extended position for raising said dome members into engagement with said suction heads;
- said suction head being effective to support said dome members when said lifting means is returned to said withdrawn position;
- a second conveyor means for moving said dome members to a dome member storage area;
- said suction head being movable between a position overlying said first conveyor means and a position overlying said second conveyor means to deliver said dome members thereto for movement to said dome member storage area.

8. Apparatus as set forth in claim 1 including:
first conveyor means for advancing an assembly comprised of a core member and a housing member joined thereto through a plurality of stations including an assembly inversion station;
a pair of spaced inversion arms engageable with said assembly as said assembly is positioned at said assembly inversion station, said arms overlying said first conveyor means in a plane higher than said assembly;
lifting means movable between a normally withdrawn position and an extended position for raising the assembly into engagement with said inversion arms;
said inversion arms being biased into engagement with the assembly and effective to support the assembly when said lifting means is returned to said withdrawn position;
inverting means for rotating said arms about an axis transverse to the direction of movement said conveyor means to reorient the assembly on said first conveyor means;
said lifting means being movable after operation of said inverting means to receive the assembly thereon once again;
means for moving said arms apart to release them from engagement with the assembly; and
said lifting means being thereafter movable to said withdrawn position to return the fixture to said first conveyor means.

9. Apparatus as set forth in claim 8 including gate means selectively engageable with the pallet to restrain it against movement on said conveyor while the pallet is positioned at said assembly inversion station.

10. Apparatus as set forth in claim 8 including:
interruption means operable upon signal for terminating operation of said apparatus;
sensor means adjacent said assembly inversion station;
switch means for activating said sensor means after operation of said mounting means to reorient the assembly on said first conveyor means;
said sensor means being normally inactive but, when activated, being responsive to the presence of a bead of sealant proximate to an upper end of the assembly to operate said interruption means to thereby cause said apparatus to terminate operation.

11. Apparatus for bonding a core member to a housing member wherein the core member has upper and lower surfaces and an outer peripheral surface extending between the upper and lower surfaces thereof and wherein the housing member has upper and lower surfaces and an inner peripheral surface extending between the upper and lower surfaces thereof defining an opening extending therethrough, said apparatus comprising:

press means for assembling the core member with the housing member so as to be generally coextensive therewith;

rib means on the inner peripheral surface and extending inwardly thereof for holding the outer peripheral surface of the core member separated from the inner peripheral surface of the housing member to thereby define at least one cavity therebetween having first and second spaced terminal regions;

first dispensing means for applying a first continuous bead of viscous sealant to the inner and outer peripheral surface at the first terminal region of the cavity;

operative means for subjecting the first bead of sealant to a nitrogen atmosphere;

electromagnetic wave generation means for curing the first bead of sealant;

second dispensing means for substantially filling the cavity with anaerobic bonding material;

said first dispensing means being operable to apply a second continuous bead of viscous sealant to the inner and outer peripheral surfaces at the second terminal region of the cavity spaced from the first terminal region and contiguous with an exposed surface of the anaerobic bonding material to thereby isolate the anaerobic bonding material within the cavity;

said operative means being operable to subject the second bead of sealant to a nitrogen atmosphere; and said electromagnetic wave generation means being operable for curing the second bead of sealant.

12. Apparatus as set forth in claim 11 including:

a fixture for supporting an assembly comprised of the housing member and the associated core member throughout the bonding operation;

said fixture including:

an upper surface having for receiving the assembly thereon; and spaced apart handles for holding the fixture with an assembly supported thereon.

13. Apparatus as set forth in claim 12 wherein said fixture includes:

a continuos circumferential seal member on its upper surface; and wherein said operative means includes:

a dome member for enveloping the assembly when it is supported on said fixture, said dome member having a lower rim engageable with said seal member to isolate the assembly from the surrounding atmosphere.

14. Apparatus as set forth in claim 13 wherein said fixture includes:

a lower surface; an opening extending between said upper and lower surfaces; and a slitted diaphragm in said opening normally sealing against flow of gases between said upper and lower surfaces; and wherein said operative means includes:

a source of an inert gas; and a needle injector connected to said source movable between a retracted position and an advanced position extending through said diaphragm to deliver the inert gas to the isolated region defined by said dome member and said fixture and to force out the ambient air through said diaphragm.

15. Apparatus as set forth in claim 14 including:

means for moving said needle injector between said retracted and said advanced positions.

16. Apparatus as set forth in claim 15 including:

means selectively holding said needle injector in said advanced position for a predetermined period of time.

17. Apparatus as set forth in claim 11 including:

discharge means for applying to the inner and outer peripheral surfaces a primary composition for accelerating the curing action of the anaerobic bonding material.

18. Apparatus as set forth in claim 11 including:

stationary support means for receiving the housing member thereon;

rotatable discharge means positioned in the opening and directed at the inner peripheral surface for spraying the inner peripheral surface;

rotatable support means for receiving the core member thereon; and stationary discharge means directed at the outer peripheral surface for spraying the outer peripheral surface upon rotation of said rotatable support means about an axis generally parallel to the plane of the outer peripheral surface.

19. Apparatus as set forth in claim 11 including:

a first conveyor having a movable element for advancing the assembly supported on a fixture and the fixture, in turn, supported on a pallet, and the pallet engageably supported on said movable element and being wider than said movable element;

said lifting means including:

a platform positioned beneath said first conveyor lying in a plane generally parallel to said movable element and having a width greater than said movable element;

at least four upstanding support members mounted on said platform at spaced locations in the direction of movement of the movable element and lying in spaced apart planes on opposite sides of said first conveyor and spaced away from said movable element;

screw member operable to move said platform between raised and lowered positions;

drive means for operating said screw members; and upper ends of said support members being engageable with the pallet as said platform is raised and causing said pallet to be raised above and out of engagement with said movable element when said platform is moved to its raised position.

* * * * *